US011675472B2

(12) United States Patent
Checkley et al.

(10) Patent No.: US 11,675,472 B2
(45) Date of Patent: Jun. 13, 2023

(54) USER INTERFACE FOR ACCESS CONTROL ENABLED NETWORK SHARING

(71) Applicant: Google LLC, Mountain View, CA (US)

(72) Inventors: Garen Checkley, San Francisco, CA (US); Mrinal Sharma, San Bruno, CA (US); Jonathan Levine, San Francisco, CA (US)

(73) Assignee: Google LLC, Mountain View, CA (US)

( * ) Notice: Subject to any disclaimer, the term of this patent is extended or adjusted under 35 U.S.C. 154(b) by 5 days.

(21) Appl. No.: 17/158,796

(22) Filed: Jan. 26, 2021

(65) Prior Publication Data
US 2021/0149529 A1    May 20, 2021

Related U.S. Application Data

(63) Continuation of application No. 15/394,985, filed on Dec. 30, 2016, now Pat. No. 10,915,216.
(Continued)

(51) Int. Cl.
G06F 3/0481    (2022.01)
H04L 9/40      (2022.01)
(Continued)

(52) U.S. Cl.
CPC ........ *G06F 3/0481* (2013.01); *H04L 63/0428* (2013.01); *H04L 63/0435* (2013.01);
(Continued)

(58) Field of Classification Search
CPC ..... G06F 21/10; H04L 9/3247; H04L 9/0825; H04L 9/083; H04L 63/126; H04L 2209/60
See application file for complete search history.

(56) References Cited

U.S. PATENT DOCUMENTS 6,229,894 B1    5/2001  Van Oorschot et al.
7,170,999 B1 *  1/2007  Kessler ............... H04L 63/045
                                                        380/278
(Continued)

FOREIGN PATENT DOCUMENTS

CN    1633062 A    6/2005
CN    1989729 A    6/2007
(Continued)

OTHER PUBLICATIONS

International Search Report for application No. PCT/US2016069385 dated Mar. 22, 2017, 5 pages.
(Continued)

*Primary Examiner* — Andrey Belousov
(74) *Attorney, Agent, or Firm* — Lowenstein Sandler LLP

(57) ABSTRACT

Technology for a user interface that supports an access control mechanism for network sharing. An example method involves providing a user interface comprising media items and media availability indicators, wherein a media availability indicator indicates one or more states of a media item; updating the media availability indicator to represent that an encrypted version of the media item and a wrapped key have been received over a connection, wherein the wrapped key was encrypted using a public key of a server; enabling the user interface to initiate the transmission of the wrapped key to the server, wherein the wrapped key comprises a cryptographic key for the encrypted version of the media item; receiving the cryptographic key that is unwrapped by the server using a private key of the server; and updating the media availability indicator of the user interface to represent the media item is available to be experienced.

20 Claims, 17 Drawing Sheets

Related U.S. Application Data

(60) Provisional application No. 62/399,865, filed on Sep. 26, 2016, provisional application No. 62/355,126, filed on Jun. 27, 2016.

(51) Int. Cl.

| | | |
|---|---|---|
| *H04W 4/80* | (2018.01) | |
| *H04W 12/02* | (2009.01) | |
| *H04W 4/21* | (2018.01) | |
| *H04W 12/033* | (2021.01) | |
| *H04W 12/084* | (2021.01) | |
| *H04L 67/1074* | (2022.01) | |

(52) U.S. Cl.
CPC ........ *H04L 63/0442* (2013.01); *H04L 63/061* (2013.01); *H04L 63/10* (2013.01); *H04L 67/1074* (2013.01); *H04W 4/21* (2018.02); *H04W 4/80* (2018.02); *H04W 12/02* (2013.01); *H04W 12/033* (2021.01); *H04W 12/084* (2021.01); *H04L 2463/062* (2013.01)

(56) References Cited

U.S. PATENT DOCUMENTS

| | | | |
|---|---|---|---|
| 7,231,516 | B1 | 6/2007 | Sparrell et al. |
| 7,370,212 | B2 | 5/2008 | Bourne |
| 8,527,424 | B2 | 9/2013 | Yamashima |
| 8,954,740 | B1 | 2/2015 | Moscaritolo |
| 9,197,700 | B2 | 11/2015 | Brouwer |
| 2001/0049820 | A1 | 12/2001 | Barton |
| 2004/0168073 | A1 | 8/2004 | Bourne et al. |
| 2005/0071632 | A1* | 3/2005 | Pauker ................. H04L 63/08 713/165 |
| 2005/0177624 | A1 | 8/2005 | Oswald et al. |
| 2005/0177853 | A1 | 8/2005 | Williams et al. |
| 2006/0015540 | A1 | 1/2006 | Takeda et al. |
| 2006/0047957 | A1 | 3/2006 | Helms et al. |
| 2007/0091914 | A1 | 4/2007 | Ashley |
| 2007/0168262 | A1 | 7/2007 | Morotomi et al. |
| 2007/0223705 | A1 | 9/2007 | Kasahara et al. |
| 2009/0276334 | A1 | 11/2009 | Hosoda et al. |
| 2010/0058064 | A1* | 3/2010 | Kirovski ............. H04L 63/0853 713/176 |
| 2010/0088399 | A1 | 4/2010 | Gluck |
| 2010/0250704 | A1 | 9/2010 | Kittel |
| 2012/0066612 | A1* | 3/2012 | Virmani ................. G06F 9/451 715/748 |
| 2012/0303951 | A1 | 11/2012 | Medvinsky et al. |
| 2013/0232038 | A1 | 9/2013 | Murray |
| 2014/0022920 | A1 | 1/2014 | Dua et al. |
| 2014/0173640 | A1 | 6/2014 | Walsh et al. |
| 2014/0281489 | A1 | 9/2014 | Peterka et al. |
| 2015/0358297 | A1 | 12/2015 | Endahl et al. |
| 2016/0301738 | A1 | 10/2016 | Gentile et al. |

FOREIGN PATENT DOCUMENTS

| | | |
|---|---|---|
| CN | 101611631 A | 12/2009 |
| CN | 104519013 A | 4/2015 |
| EP | 1521423 | 4/2005 |
| JP | 2009135721 | 6/2009 |
| WO | 2018057762 | 3/2018 |

OTHER PUBLICATIONS

Fastfilmz to help users share HD quality movies with close to no data usage http://tech.economictimes.indiatimes.com/news/startups/fastfilmz-to-help-users-share-hd-quality-movies-with-close-to-no-data-usage/52547082, Jun. 2, 2016.

A.Menezes and P. van OoRschot, "Key Management Techniques" Handbook of Applied Cryptography, chapter 13, 1996, 49 pages, http://cacr.uwaterloo.ca/hac/aboutlchap13.pdf.

International Search Report and Written Opinion for Application No. PCT/US2017/052756 dated Dec. 15, 2017, 11 pages.

Extended European Search Report for Application No. 17853909.4 dated Jan. 24, 2020, 7 pages.

Japanese Patent Application No. 2019-512679 Office Action dated Mar. 16, 2020, 4 pages.

Korean Patent Application No. 10-2019-7009496 Office Action dated Jun. 19, 2020, 6 pages.

China Office Action for Application No. 202110187389.5, dated Sep. 20, 2022, 21 pages.

* cited by examiner

USER INTERFACE FOR ACCESS CONTROL ENABLED NETWORK SHARING

RELATED APPLICATIONS

This application is a continuation of application Ser. No. 15/394,985, filed Dec. 30, 2016, entitled "A User Interface for Access Control Enabled Peer-to-Peer Sharing," which claims the benefit of U.S. Provisional Patent Application No. 62/355,126 filed Jun. 27, 2016, entitled "Access Control Technology for Peer-to-Peer Sharing," and U.S. Provisional Patent Application No. 62/399,865 filed Sep. 26, 2016, entitled "A User Interface for Access Control Enabled Peer-to-Peer Sharing," which are both incorporated herein by reference herein.

TECHNICAL FIELD

This disclosure relates to the field of content sharing platforms and, in particular, to a user interface that supports access control technology for a peer-to-peer sharing system.

BACKGROUND

Content-sharing platforms and their corresponding websites and mobile applications ("apps") enable user devices to share and play streaming content, such as streaming music and video. Streaming content may require a large amount of bandwidth and some connections may not provide the bandwidth necessary to stream content. Content-sharing platforms may enable the user to download or offline the streaming content while using a higher bandwidth connection and enable the user to subsequently play the streaming content when the user device is disconnected or using a low bandwidth connection.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes providing for display a user interface including a plurality of media items and a plurality of media availability indicators. A portion of the user interface may represent that an encrypted version of a media item and a wrapped version of an encryption key are being received. The method may include updating a media availability indicator of the media item to represent that the encrypted version of the media item and the wrapped version of an encryption key are saved. The method may further include receiving an indication that the encrypted version of the media item is decrypted and updating the media availability indicator to represent the media item is available to be experienced. In another implementation, the media availability indicator may be used to distinguish between three states of the media item, a first state indicating the media item is not saved on a user device, a second state indicating the media item is saved in the encrypted version, and a third state indicating the media item is saved and available to be experienced.

In one implementation, the user interface may include a graphical control element to initiate the receiving of the wrapped version of the encryption key for the media item over a peer-to-peer connection. The user interface may indicate the peer-to-peer connection used to receive the encrypted version of the media item and may indicate that an internet connection is used to decrypt the media item. In a further implementation, the user interface may include a peer-to-peer connection indicator identifying a user device that is providing the encrypted version of the media item and identifying a user device that is receiving the encrypted version of the media item.

In another implementation, each of the plurality of media items are represented within the user interface by a media entry comprising a first graphical portion and a second graphical portion. The first graphical portion may include an image of a respective media item and the second graphical portion may include textual information of the respective media item. In a further implementation, the method may involve receiving user input corresponding to a particular media item and initiating a presentation of the particular media item and the user interface may include a portion for the presenting of the particular media item on a user device.

In further aspects of the disclosure, a system and a non-transitory machine-readable storage medium for storing instructions that cause a processing device to perform the above operations is disclosed.

BRIEF DESCRIPTION OF THE DRAWINGS

The present disclosure is illustrated by way of example, and not by way of limitation, in the figures of the accompanying drawings.

DETAILED DESCRIPTION

Figure 1:
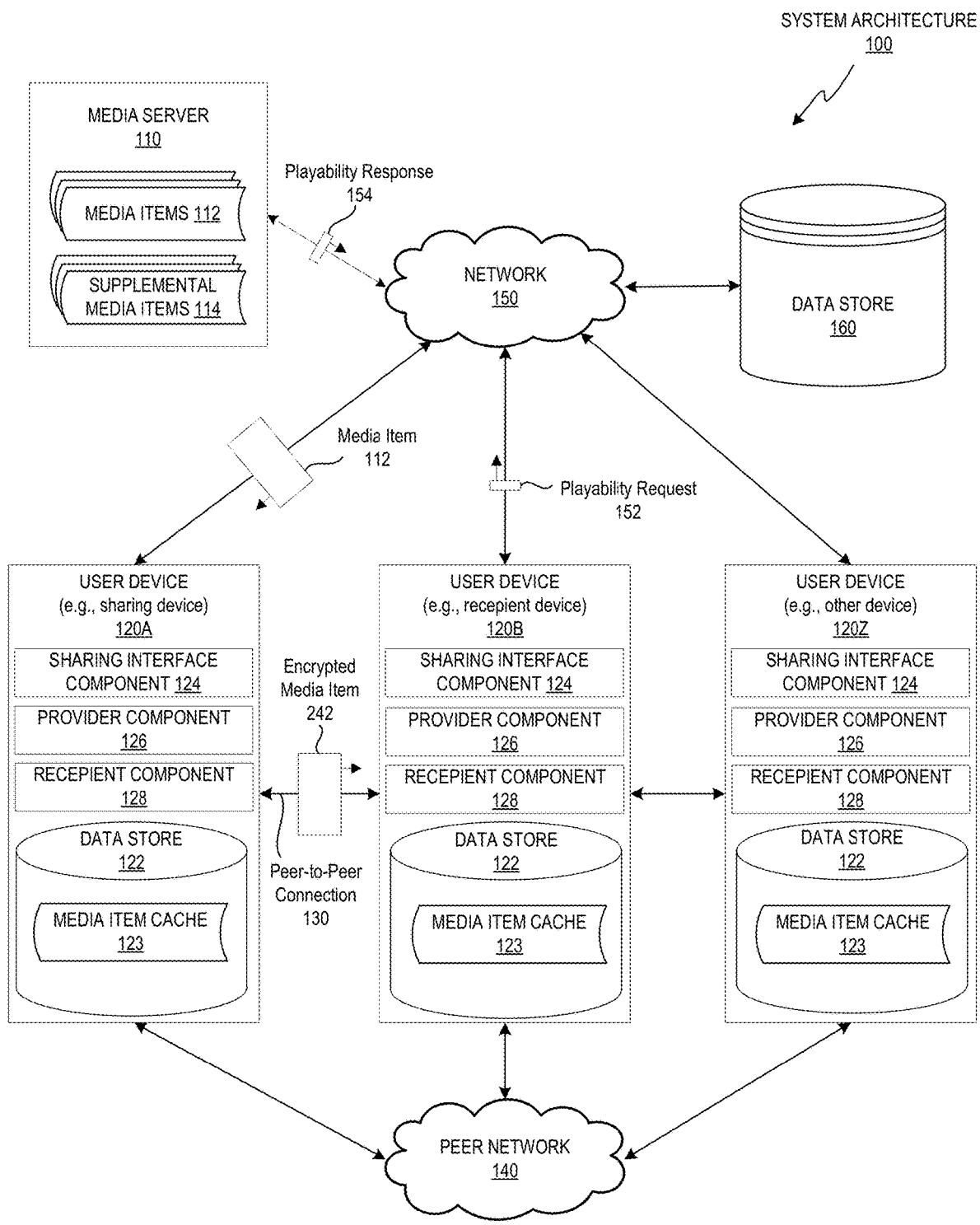
FIG. 1 is a block diagram illustrating an exemplary system architecture, in accordance with an implementation of the disclosure.

Aspects and implementations of the disclosure are directed to a user interface for peer-to-peer content sharing technology. The user interface enhances the user's ability to share and receive media items using a peer-to-peer content sharing technology. Traditional content sharing technology may include centralized sharing systems that require a network connection with a large bandwidth in order to stream online content. In many emerging markets, the capabilities of the computing networks are limited and they often have low bandwidth, are unreliable, or unavailable. Peer-to-peer networking may allow for exchange of content when networking infrastructure or internet access is limited. A problem with peer-to-peer networking is that it often provides unrestricted reproduction and access to the exchanged content, which may be unauthorized by the content creators and/or providers and may be challenging to monitor or enforce.

Aspects of the present disclosure address the above and other deficiencies by providing a user interface for a peer-to-peer sharing system that uses a centralized access control mechanism. The centralized access control mechanism may manage the access of user devices to media items stored on the user devices. The centralized access control mechanism may support one or more digital rights management (DRM) schemes to control the use, modification, and distribution of copyrighted media items. In one example, the content sharing technology may involve a media server and multiple user devices of different users. The media server may provide media items to a user device of a first user ("first user device") and enable the first user device to share the media items with a user device of a second user ("second user device"). The user devices may be mobile devices such as phones, tablets, or laptops and may be capable of storing the media items locally.

In one example, the first user device may stream the media item directly from the media server (e.g., over the Internet) and may store the streaming media locally. The first user device may encrypt the media item using a locally generated encryption key and may wrap the encryption key using a public key from the media server. The first user device may then transfer the encrypted media item and the wrapped encryption key to the second user device (e.g., via a peer-to-peer connection when the first user device and/or the second user device have limited or no Internet access). The second user device may access the encrypted media item but may be restricted from playing the encrypted media item until it contacts the media server. The second user device may contact the media server using a playability request, which may include the wrapped encryption key and identification information for the media item. The media server may then perform a playability check to ensure that the second user device is authorized to view the media item. The media server may then respond using a playability response that includes the unwrapped encryption key, which may enable the second user device to decrypt and play the media item.

The peer-to-peer content sharing technology may include one or more user interfaces that enable a user to control which media items are shared and represent the states of the shared media items. The states may correspond to the availability of the media item. For example, a first state may correspond to a media item that is being received or transferred to one of the user devices. A second state may indicate that an encrypted version of the media item and a corresponding wrapped encryption key are saved on the user device. The third state may indicate that the media item has been decrypted and is ready to be presented on the user device. The user interface may be updated during use to modify the media item indicators so that they represent the current state of the media items. In other examples, the user interface may also indicate a peer-to-peer connection used to receive the encrypted version of the media item and indicate that an internet connection is used to decrypt the media item.

The technology disclosed herein is advantageous because it enhances the ability of a user to share media items using peer-to-peer sharing technology with limited or no Internet access and also provide a central mechanism to manage and monitor access to the shared media items. The technology may decrease the amount of bandwidth necessary to share media items, which may be beneficial to the media server, intermediate networking infrastructure (e.g., Internet Service Providers (ISPs), and user devices and may be particularly beneficial in emerging markets. In the past, each of the user devices may have accessed the media item from the media server and now many of the user devices can access the media item from a peer and only contact the media server to receive authorization to view the media item. The amount of network traffic required to check the authorization may be orders of magnitude less than the amount of network traffic or bandwidth required to stream or download the media item from the media server. The technology is also advantageous because it may enhance the ability of the media server to determine viewership of a media item shared via a peer-to-peer connection, determine monetization for content creators or providers, and provide supplemental media items (e.g., related videos or advertisements).

Implementations of the disclosure often reference videos for simplicity and brevity. However, the teaching of the present disclosure are applied to media items generally and can be applied to various types of content or media items, including for example, video, audio, text, images, program instructions, etc.

FIG. 1 illustrates an example system architecture 100, in accordance with one implementation of the disclosure. The system architecture 100 includes media server 110, user devices 120A-Z, a peer-to-peer connection 130, a peer network 140, a network 150, and a data store 160.

Media server 110 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. Media server 110 may be a part of a content sharing platform that may allow users to consume, upload, share, search for, approve of ("like"), dislike, and/or comment on media items. The content sharing platform may also include a website (e.g., a webpage) or application back-end software that may be used to provide a user with access to the media items.

Media server 110 may host content, such as media items 112 and supplemental media items 114. Media items 112 and supplemental media items 114 may be digital content chosen by a user, digital content made available by a user, digital content uploaded by a user, digital content chosen by a content provider, digital content chosen by a broadcaster, etc. Examples of media items 112 and supplemental media items 114 include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc.

Media items 112 and supplemental media items 114 may be consumed via the Internet and/or via a mobile device application. For brevity and simplicity, an online video (also hereinafter referred to as a video) is used as an example of a media item 112 throughout this document. As used herein, "media," media item," "online media item," "digital media," "digital media item," "content," and "content item" can include an electronic file that can be executed or loaded using software, firmware or hardware configured to present the digital media item to an entity. In one implementation, the content sharing platform may store the media items 112 using the data store 160. In one example, media item 112 may be a user generated video identified by a user of user device 120A and supplemental media item 112 may be an advertisement selected by media server 110 to be presented before, during or after presenting media item 112 on one or more of the user devices 120A-Z.

User devices 120A-Z may each include computing devices such as personal computers (PCs), laptops, mobile phones, smart phones, tablet computers, netbook computers, network-connected televisions, etc. In some implementations, user devices 120A-Z may also be referred to as "client devices." User devices 120A-Z may be capable of receiving media items 112 from media server 110 over a network 150 and capable of sharing media items 112 with other user devices via a peer-to-peer connection 130, a peer network 140, a network 150, or a combination thereof.

Peer-to-peer connection 130 may be any communication channel between one or more user devices 120A-Z. Peer-to-peer connection 130 may be based on any wireless or wired communication technology and may connect a first user device directly or indirectly (e.g., involving an intermediate user device) to a second user device. The wireless communication technology may include Bluetooth®, Wifi®, infrared, ultrasonic or other technology. The wired communication may include universal serial bus (USB), ethernet, RS 232, or other wired connection. In other examples, the peer-to-peer connection 130 may involve transporting a removable storage medium between user devices to transfer media items and other data. The removable storage medium may be in any form including a Secure Digital (SD) card, Multi Media Card (MMC), flash drive, other data storage device, or combination thereof. The peer-to-peer connection may be an individual connection between two devices or may comprise multiple connections that are part of peer network 140.

Peer network 140 may be a computing network that provides one or more communication channels between user devices 120A-Z. In one example, peer network 140 may be a peer-to-peer network that does not rely on a pre-existing network infrastructure (e.g., access points, switches, routers) and the user devices A-Z may replace the networking infrastructure to route communications between the user devices. Peer-to-peer network 140 may be an wireless network that is self-configuring and enables user devices 120A-Z to contribute to peer network 140 and dynamically connect and disconnect from peer network 140 (e.g., ad hoc wireless network). In another example, peer network 140 may be a computing network that includes networking infrastructure that enables user devices to communicate with other user devices. In the latter example, peer network 140 may or may not have access to the public network (e.g., internet). For example, a vehicle (e.g., bus, train) or location (e.g., classroom, library, café) may provide an access point or user device that may function as an access point to enable user devices to communicate with one another without providing internet access. Alternatively, the peer network may provide access to a larger network such as network 150 (e.g., internet).

Network 150 may be a public network that provides one or more of user devices 120A-Z with access to media server 110 and other publically available computing devices. Network 150 may include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, and/or a combination thereof.

Each of user devices 120A-Z may include a media viewer that allows users to view media items 112 that are shared over peer network 140 and/or network 150. The media viewer may present images, videos, audio, web pages, documents, etc. In one example, the media viewer may be a web browser that can access, retrieve, present, and/or navigate content (e.g., web pages such as Hyper Text Markup Language (HTML) pages, digital media items, etc.) served by a web server. The media viewer may render, display, and/or present the content (e.g., a web page, a media viewer) to a user. The media viewer may also display an embedded media player (e.g., a Flash® player or an HTML5 player) that is embedded in a web page (e.g., a web page that may provide information about a product sold by an online merchant). In another example, the media viewer may be a standalone application (e.g., a mobile application or app) that allows users to view digital media items (e.g., digital videos, digital images, electronic books, etc.).

According to aspects of the disclosure, the media viewer may be a content sharing platform application for users to share, record, edit, and/or upload content to the content sharing platform. The media viewer may be provided to user devices 120A-Z by media server 110 or a content sharing platform. For example, the media viewers may be embedded media players that are embedded in web pages provided by the content sharing platform. In another example, the media viewers may be applications that are installed and executed on user devices 120A-Z.

In the example shown in FIG. 1, each user device may function as a media sharing device (e.g., user device 120A), a media recipient device (e.g., user device 120B), or a combination of both. Each user device may include a data store 122, a sharing interface component 124, a provider component 126, a recipient component 128, and a data store 122.

Data store 122 may be a memory (e.g., random access memory), a drive (e.g., a hard drive, a flash drive), a database system, or another type of component or device capable of storing data. Data store 122 may include multiple storage components (e.g., multiple drives or multiple databases) that may span multiple computing devices (e.g., multiple server computers). Data store 122 may include a media cache 123 that stores copies of media items that are received from the media server 110. In one example, each media item 112 may be a file that is downloaded from media server 110 and may be stored locally in media cache 123. In another example, each media item 112 may be streamed from media server 110 and may exist as an ephemeral copy in memory of a user device until it is off-lined. Off-lining refers to a user device storing an ephemeral copy of the streaming media in persistent data storage of the user device. This may enable the user device to access the streamed media item at a later point in time (e.g., after a reboot) without using an internet connection. In one example, the media item may be streamed by the user device to itself when presenting the media item. In one example, a user device may off-line a streamed media item by copying one or more streams of a media item (e.g., video stream, audio stream) to the persistent data storage.

Sharing interface component 124 may provide a user interface that enables a user to select one or more user devices to be involved with sharing media items. Sharing interface component 124 may provide a user interface that enables a user to select one or more media items from a media cache to be shared. The media items may be available within the media cache of the local user device or the media cache of a remote user device. The user interface may enable the user to identify the state of media items and whether they are saved on the local user device and whether they need to be decrypted before being available for consumption. Example user interfaces will be discussed in more detail in regards to FIGS. 6A-14.

Provider component 126 may include functionality that enables the user device to share media items to one or more other user devices. The provider component 126 may generate an encryption key and encrypt a media item to reduce unauthorized access to the media item. Provider component 126 may also wrap the encryption key and may share the wrapped encryption key and the encrypted media item with one or more other user devices (e.g., recipient devices).

Recipient component 128 may include functionality that enables the user device to receive and process encrypted media items. Recipient component 128 may process an incoming media item by gathering information from the media item, the providing device, the recipient device, or a combination thereof. The information may be sent to the media server so that the media server can determine whether the user device is authorized to play the media item. In one example, the receiving user device may send the wrapped encryption key to the media server in playability request 152 and the media server may unwrap the encryption key and send it back to the user device in playability response 154. The user device may then use the unwrapped encryption key to decrypt the media item.

In general, functions described in one implementation as being performed by the content sharing platform can also be performed on the client devices 120A through 120Z in other implementations, if appropriate. In addition, the functionality attributed to a particular component can be performed by different or multiple components operating together. The content sharing platform and media server 110 can also be accessed as a service provided to other systems or devices through appropriate application programming interfaces, and thus is not limited to use in websites.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline, such as a topic channel, of the content sharing platform.

Although implementations of the disclosure are discussed in terms of a media server and a content sharing platform, implementations may also be generally applied to any type of social network providing digital content and connections between users.

In situations in which the systems discussed here collect personal information about users, or may make use of personal information, the users may be provided with an opportunity to control whether the content sharing platform collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform.

Figure 2:
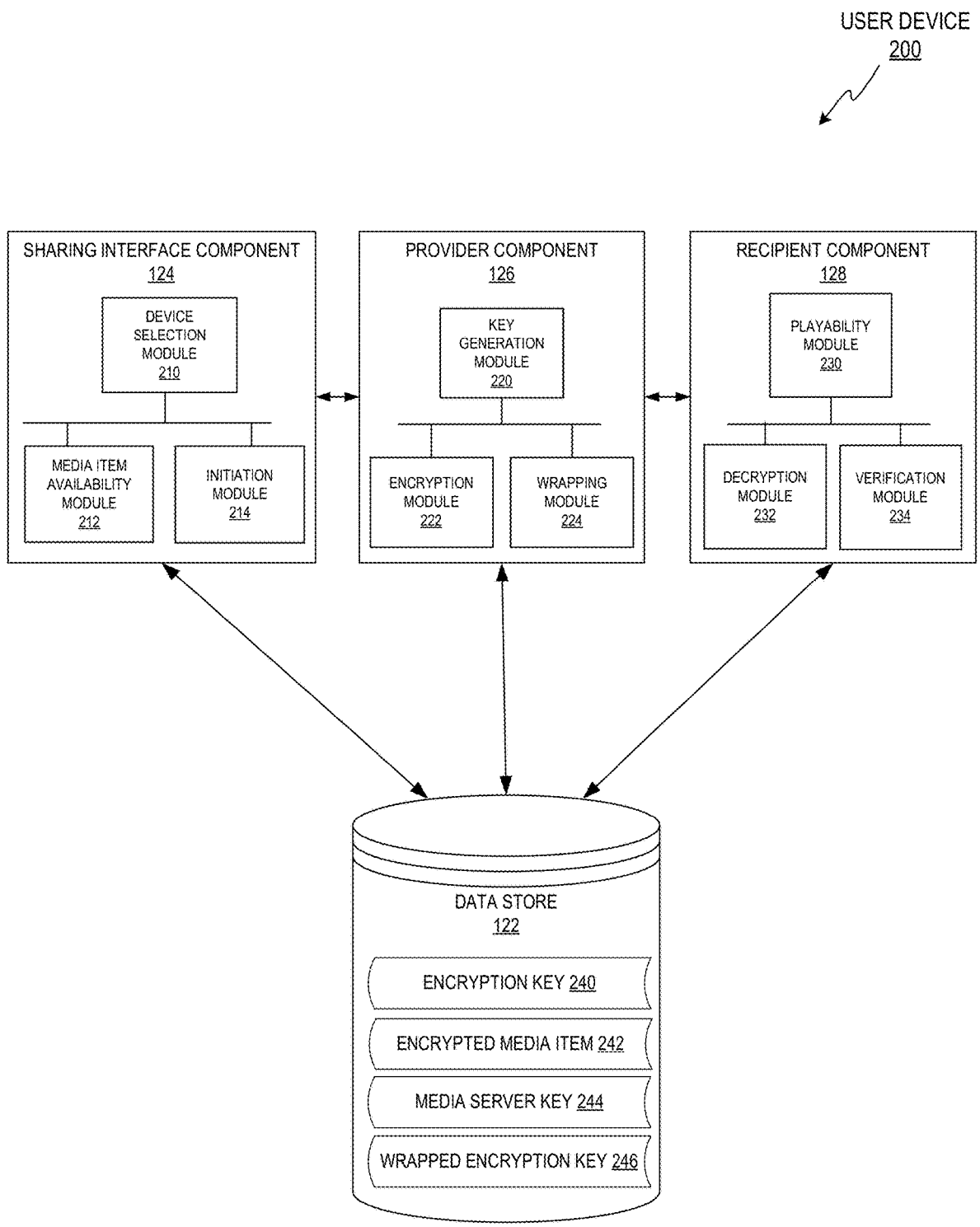
FIG. 2 is a block diagram illustrating the components and modules of an example user device, in accordance with an implementation of the disclosure.

FIG. 2 is a block diagram illustrating an example user device 200. User device 200 may be the same or similar to user devices 120A-Z. In the example shown in FIG. 2, user device 200 includes sharing interface component 124, provider component 126, recipient component 128, and data store 122.

Sharing interface component 124 may provide a user interface that enables a user of user device 200 to view and select available user devices and media items for sharing. Sharing interface component 124 may include a device selection module 210, a media item availability module 212, and an initiation module 214.

Device selection module 210 may search for and display one or more user devices that are available for sharing. Device selection module 210 may identify the user devices by sending out a broadcast message and waiting for a response. The broadcast message may identify information about user device 200 such as identification information (e.g., device identifier, user identifier), device resources (e.g., processing power, storage capacity, battery power), media item presentation capabilities (e.g., ability to play a particular media item format), other information or a combination thereof. User device 200 may then receive a response from one or more other devices. The responses may include information about the other user devices such as media cache information (e.g., available media items), identification information (e.g., device identifier, user identifier), device resources (e.g., battery power, network connections, processing power, storage capacity), other information or a combination thereof. In one example, the request and/or response may include anonymized data instead of identification information. Device selection module 210 may display the user devices that responded in a graphical interface, which may be capable of receiving user input to select one or more of the user devices. An example graphical user interface will be discussed in more detail in regards to FIG. 8.

Media item availability module 212 may determine which media items are available for sharing. In some examples, all media items that are in the media cache of a sharing user device may be available for sharing. In other examples, a user device may identify a subset of the media items in the media cache to share. The subset may include no media items, some media items, all media items, or other variation. The subset may be determined by the user device in view of user input, device resources, media server input, or a combination thereof. In one example, the user may identify one or more particular media items in the media cache to be made available for sharing. In another example, the user device may analyze device resources (e.g., battery power, network bandwidth) and determine which if any media items should be shared. In yet another example, the media server may provide input that identifies one or more media items to share. This may be in attempt to distribute the number of user devices that have a particular media item to enhance media item availability and sharing without burdening any particular user device. Media item availability module 212 may display the media items that are available for sharing in a graphical user interface, which may be capable of receiving user input to select one or more of the user devices.

Initiation module 214 may communicate with media item availability module 212 and device selection module 210 to identify a particular user device and/or media item for sharing. The sharing may involve pushing the media item to the user device or pulling the media item from the user device or a combination of both. In one example, user device 200 may receive user input identifying a remote user device and a local media item and the initiation module 214 may initiate the pushing of the identified media item to the remote user device. In another example, user device 200 may receive user input identifying a remote user device and a media item available on the remote user device and the initiation module 214 may initiated the pulling of the identified media item from the remote user device. In other examples, user device may pull a media item from a first user device and may then push the media item to a second user device.

Sharing interface component 124 may function in multiple modes including a one-on-one mode, a public mode, and a private mode. The one-on-one mode may be similar to the push and pull features discussed above and may involve the user device receiving user input identifying a particular media item and a particular device for sharing. The media item may then be transferred from one device to the other device (i.e., one-to-one).

The public mode may be similar to the one-on-one mode in that user device 200 may receive user input selecting a particular media item, but when the public mode is enabled there may be multiple sharing devices and multiple recipient devices. Some or all of the sharing devices may broadcast their available media items. User device 200 may then select one or more of the media items without selecting a specific user device. In this example, the user device that is sharing the selected media item may remain anonymous to user device 200. Conversely, user device 200 may participate as a sharing device and broadcast a set of available media items and anonymously transfer one or more of the media items when requested by another user device.

The private mode may be similar to the one-on-one mode and the public mode but may include an approval stage. During the approval stage, the user device that is sharing the media item may receive a sharing request for a particular media item and may approve or disapprove the sharing request. In one example, the approval or disapproval may be based on user input, in which case the interaction module may notify the user and the user may provide input that approves or disapproves the sharing.

After sharing interface component 124 has identified a media item and initiated the sharing, it may interact with provider component 126 or recipient component 128. Provider component 126 may be used when user device 200 is sharing a media item to another user devices and recipient component 128 may be used when user device 200 is receiving a shared media item from another user device.

Provider component 126 may include a key generation module 220, an encryption module 222, and a wrapping module 224. The functions performed by provider component 126 may be performed at any point in the sharing process, such as before, during, or after a media item is received from a media server, selected for sharing, or after the sharing is initiated.

Key generation module 220 may create one or more encryption keys 240 for a user device. Each encryption key 240 may include a piece of information that determines the functional output of a cryptographic function and may be used to encrypt and decrypt a media item. The key generation module 220 may generate encryption key 240 using a random number generator, a pseudorandom number generator, a key derivation function, other mechanism, or a combination thereof. Key generation module 220 may seed the key generation using information available to the user device such as a device identifier, a time stamp, an IP address, a MAC address, a user identifier, other information, or a combination thereof. In an alternative example, encryption key 240 may be generated by the media server or other portion of the content sharing platform and sent to user device 200.

Encryption module 222 may use the encryption key 240 generated by key generation module 220 to encrypt one or more media items. In one example, each media item on user device 200 may be encrypted using a different encryption key 240. In another example, multiple (e.g., all) media items on user device 200 may be encrypted using encryption key 240. Encryption module 222 may encrypt the media items using a symmetric key cryptography system that uses a single shared key, such as, Data Encryption Standard (DES) or Advanced Encryption Standard (AES). In other embodiments, encryption module 222 may also or alternatively encrypt the media items using an asymmetric cryptography or public-key cryptography system that uses multiple keys (e.g., public key and a private key), such as, Rivest-Shamir-Adleman (RSA).

Wrapping module 224 may wrap encryption key 240 using a media server key 244. Media server key 244 may be a public key that is generated by the media server or other portion of a content sharing platform and sent to user device 200. Wrapping module 224 may use media server key 244 along with a key encapsulation mechanism to secure the encryption key 240 while it is transferred to and stored on another user device.

In one example, encryption module 222 may use a symmetric key cryptography system to encrypt the media item and the wrapping module 224 may an asymmetric cryptography system to wrap the encryption key 240. As discussed above, the asymmetric cryptography or public-key cryptography system may be the same or similar to RSA. After wrapping the encryption key, user device 200 may transfer the encrypted media item 112 (e.g., cipher text) and the wrapped encryption key 240 to another device.

Recipient component 128 may be used when user device 200 is receiving a media item that is shared by another user device. Recipient component 128 may include a playability module 230, a decryption module 232, and a verification module 234.

Playability module 230 may communicate with the media server to determine whether user device 200 is authorized to present the media item. The communication with the media server may involve transmitting a playability request and receiving a playability response. The playability request may include the wrapped encryption key and information related to the media item, the recipient or sharing device, the recipient or sharing user, other information, or combination thereof. The media server may then analyze this information and compare it to information from one or more data stores (e.g., databases) to determine whether user device 200 is authorized to present the media item to the user. The analysis may involve checking whether the media item is still available for presentation and whether it has any restrictions. For example, the media item may be restricted to mature audiences (e.g., not for children) or it may be restricted to or from certain geographic areas (e.g., certain countries). After determining the playability check has been satisfied, the media server may unwrap the wrapped encryption key. Unwrapping the encryption key may involve a similar cryptographic system that was used to wrap the encryption key and may utilize the private key associated with the media server key (e.g., public key). The media server may then send the unwrapped encryption key back to user device 200 in the playability response.

Decryption module 232 may use the unwrapped encryption key to decrypt the encrypted media item 112. Unwrapping the encryption key may involve a similar cryptographic system that was used to encrypt the media item as discussed above in regards to encryption module 222.

Verification module 234 may determine whether the media item is authentic and whether it includes any unauthorized modifications. Verification module 234 may use a digital signature associated with the media item to verify the media item. The digital signature may be based on the media item (e.g., video and/or audio bytes) and a private signing key of the media server and may be computed using any digital signature mechanism. In one example, the digital signature mechanism may be the same or similar to an elliptic curve digital signature algorithm (ECDSA) and may use elliptic curve cryptography or any other form of cryptography to compute the digital signature. The digital signature may be computed by the media server or other portion of the content sharing platform and may be received by user device 200 from the user device that shared the media item (e.g., with the encrypted media item) or directly from the media server (e.g., with the playability response). Verification module 234 may analyze the decrypted media item in view of the digital signature to perform the verification. In one example, verification module 234 may compute a hash of the media item (e.g., video and/or audio bytes) and use the hash, the digital signature, and a public verification key of the media server to verify the decrypted media item. The hash may be computed using a cryptographic hash function such as a Secure Hash Algorithm (SHA) or any other hash function.

Figure 3:
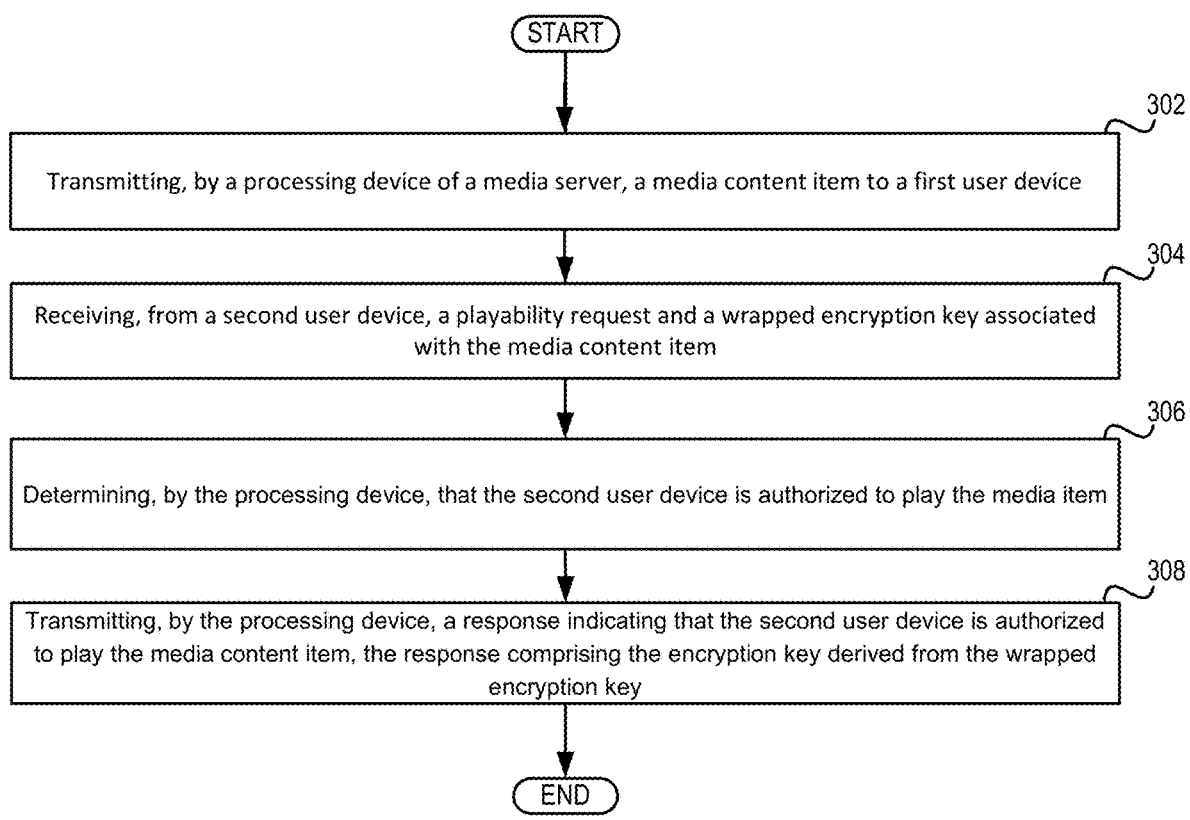
FIG. 3 is a flow diagram illustrating an example method of a media server, in accordance with an implementation of the disclosure.
Figure 4:
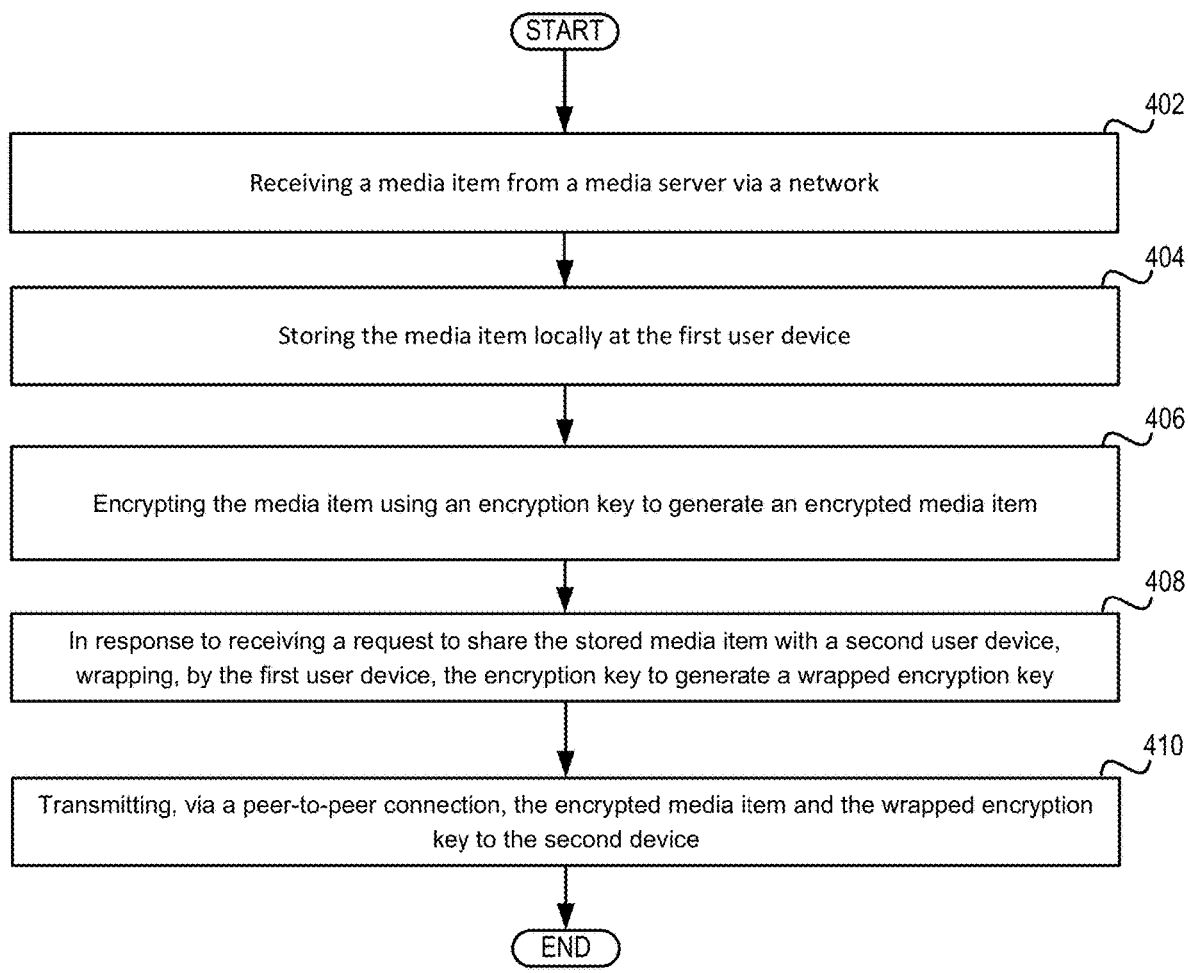
FIG. 4 is a flow diagram illustrating an example method of a user device that provides a shared media item, in accordance with an implementation of the disclosure.
Figure 5:
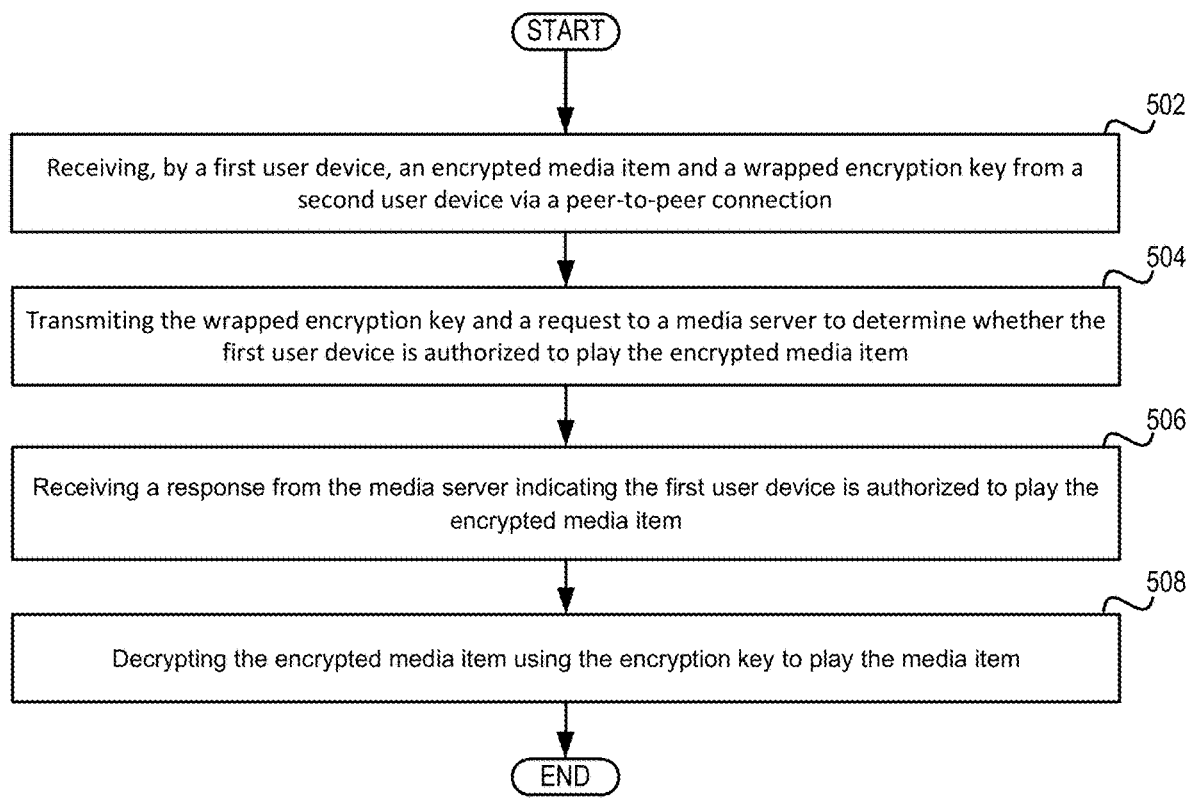
FIG. 5 is a flow diagram illustrating an example method of a user device that is receiving a shared media item, in accordance with an implementation of the disclosure.

FIGS. 3, 4, and 5 depict flow diagrams for illustrative examples of methods 300, 400, and 500 for implementing an access control mechanism for peer-to-peer media sharing. Method 300 illustrates an example process flow from the perspective of a media server and methods 400 and 500 are example methods for a sharing user device and a recipient user device respectively. Methods 300, 400, and 500 may be performed by processing devices that may comprise hardware (e.g., circuitry, dedicated logic), software (such as is run on a general purpose computer system or a dedicated machine), or a combination of both. Methods 300, 400 and 500 and each of their individual functions, routines, subroutines, or operations may be performed by one or more processors of the computer device executing the method. In certain implementations, methods 300, 400 and 500 may each be performed by a single processing thread. Alternatively, methods 300, 400, and 500 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 may be performed by media server 110 and methods 400 and 500 may be performed by user device 120 of FIG. 1.

Referring to FIG. 3, method 300 may be performed by one or more processing devices of a media server and may begin at block 302. At block 302, the processing device of the media server may transmit a media item to a first user device. The media item may comprise video, audio, images, text, other media or combination thereof. The processing device of the media server may also transmit one or more encryption keys to the first user device. One of the encryption keys may be used by the first user device to wrap a device key (e.g., encryption key) generated by the user device. Wrapping (e.g., encapsulating) the device key may be advantageous because it may mask the encryption key as cipher text when it is being transmitted over a peer-to-peer connection and/or stored on an untrusted peer. In another example, the media server may transmit a second encryption key to the first user device. The second encryption key may be generated by the media item and may be used as an alternative to the encryption key generated by the user device for encrypting the media item.

At block 304, the processing device may receive, from a second user device, a playability request and a wrapped encryption key associated with the media item. The playability request may inquire as to whether the second user device is authorized to play the media item that was shared by the first user device with the second user device via a peer-to-peer connection. In one example, the wrapped encryption key may comprise a symmetric encryption key that is encapsulated using an asymmetric encryption key. The symmetric encryption key may be the encryption key generated by the user device and used to encrypt the media item. The asymmetric encryption key may be a public key that was provided by the media server for wrapping the symmetric encryption key. In one example, the playability request may include the wrapped encryption key and information related to the media item, the recipient or sharing device, recipient or sharing user, other information or combination thereof.

At block 306, the processing device may determine that the second user device is authorized to play the media item. The determination may involve the media item analyzing the information in the playability request and comparing it to information from one or more data stores (e.g., databases). The analysis may involve checking whether the media item is still available for presentation and whether the media has any restrictions on making copies or being viewed. In one example, the processing device of the media server may also verify that the media item does not include an unauthorized modification. The verification may be performed by comparing information (e.g., a hash) associated with the version of the media item on the second user device to information (e.g., digital signature) associated with the version of the media item on the media server.

At block 308, the processing device may transmit a response indicating that the second user device is authorized to play the media item, the response comprising the encryption key derived from the wrapped encryption key. Deriving the encryption key may involve unwrapping the wrapped encryption key using a private key that corresponds to the public key used to wrap the key. The private key and the public key may be part of a key pair accessible to the media server and the media server may have previously provided the public key to the first user device to wrap the encryption key. The wrapped encryption key may comprise cipher text and unwrapping the encryption key may involve using the private key in combination with an asymmetric cryptographic function (e.g., public-key cryptographic function) to derive the encryption key from the cipher text. The second user device may use the encryption key to decrypt the media item and once decrypted the media item may be presented to a user of the second user device.

The processing device of the media server may also provide a supplemental media item to be presented by the second user device before, during, or after the presentation of the media item. The supplemental media item may include any media content and may function as an advertisement. In one example, the supplemental media item may be provided to the first user device along with the playability response. For example, the playability response may include the supplemental media item or the supplemental media item may be included in another response from the media server or other device (e.g., partner, affiliate). In another example, the supplemental media item may be provided to the first user device and may be transmitted from the first user device to the second user device before, during or after transmitting the encrypted media item. Responsive to completing the operations described herein above with references to block 308, the method may terminate.

In other examples, method 300 may involve verifying the media item received by the second user device originated from the media server. The verification may occur at any point prior to playing the media item on the second user device and may be performed by the media server, the first user device, the second user device, other device or combination thereof. For example, it may occur prior to the second user device receiving the encrypted media item from the first user device, prior to decrypting the media item on the second user device, prior to playing media item, or any other time. In one example, the verification may be performed by the second device (e.g., recipient device) and may involve analyzing a hash. The hash may be based on the decrypted version of the media item and may be computed by the second device. The second device may also analyze a digital signature that was created by the media server and received directly from the media server or received from the user device that shared the encrypted media item and wrapped encryption key. The second user device may then analyze the hash and the digital signature to determine that the decrypted media item is authentic.

Referring to FIG. 4, method 400 may be performed by processing devices of a user device that is sharing a media item with another user device. The sharing may be initiated by the sharing device or the recipient device. Sharing that is initiated by the sharing device may be considered a push-based sharing because the media item may be pushed from the sharing device to the recipient device. Sharing that is initiated by the recipient device may be considered a pull-based sharing because the media item is pulled from the sharing device to the recipient device.

Method 400 may begin at block 402, wherein the processing device of a first user device may receive a media item from a media server via a network. The media item may be streamed or downloaded from the media server to the first user device using any streaming or file transfer technology. The streaming technology may separate the media item into an audio stream and a video stream. The audio stream may be compressed using an audio codec such as MP3, advanced audio coding (AAC), Opus, other encoding mechanism, or combination thereof. The video stream may be compressed using a video codec such as H.264, VP8, other encoding mechanism, or combination thereof. The streaming technology may also or alternatively assemble the audio stream and video stream into a container stream (e.g., bitstream) such as MP4, Flash Video (FLV), advanced systems format (ASF), internet streaming media alliance (ISMA), other encoding mechanism, or combination thereof. File transfer technology may be based on any file transfer protocol such as hypertext transfer protocol (HTTP), file transfer protocol (FTP), trivial file transfer protocol (TFTP), BitTorrent, other protocol, or a combination thereof.

At block 404, the processing device may store the media item locally at the first user device. When utilizing streaming media, the storing may involve off-lining the streamed media item to persistent storage. A user device may off-line a streamed media item by copying one or more streams of the media item (e.g., video stream, audio stream) from memory to the persistent data storage. In one example, the first user device may request permission from the media server in order to off-line a media item and the media server may respond with an encryption key (e.g., caching token) to encrypt the off-lined media item. In another example, the first user device may generate an encryption key itself as opposed to receiving it from the media server.

At block 406, the processing device may encrypt the media item using an encryption key to generate an encrypted media item. The encryption key for encrypting the media item may be generated by the processing device or by the media server. In one example, encrypting the media item may involve using a symmetric key cryptography system that uses a single shared key, such as, Data Encryption Standard (DES) or Advanced Encryption Standard (AES). In other example, encrypting the media item may involve using an asymmetric cryptography or public-key cryptography system that uses multiple keys (e.g., public key and a private key), such as, the Rivest-Shamir-Adleman cryptographic system (RSA).

At block 408, the processing device may, in response to receiving a request to share the stored media item with a second user device, wrap the encryption key to generate a wrapped encryption key. As discussed above, the sharing of the media item may be requested by the sharing device (e.g., first user device) in which case the media item is pushed to the recipient device (e.g., second user device) or the sharing may be requested by the recipient device in which case the media item is pulled from by the recipient device from the sharing device. When pushing the media item, the request may be based on user input received from a user, which may select the media item, the destination device, or a combination of both. When pulling the media item, the request may be based on a message received by the recipient device that indicates the recipient device is requesting the media item to be shared. After receiving the request, the processing device may wrap the encryption key by encrypting the encryption key using a public key of the media server.

At block 410, the processing device may transmit, via a peer-to-peer connection, the encrypted media item and the wrapped encryption key to the recipient device. In one example, the sharing device may also transmit a supplemental media item or a link to the supplemental media item to the recipient device. The supplemental media item or link to the supplemental media item may have originated from the media server and may be transferred with the media item. In another example, the sharing device may also transmit metadata of the media item to the recipient device and the metadata may be transferred while unencrypted. Responsive to completing the operations described herein above with references to block 410, the method may terminate.

Referring to FIG. 5, method 500 may be performed by processing devices of a recipient user device that is receiving a media item from a sharing device. Method 500 may begin at block 502, when a processing device of the recipient user device may receive an encrypted media item and a wrapped encryption key from a sharing user device over a peer-to-peer connection. In one example, the peer-to-peer connection may be a direct connection between the two devices using wireless technology, wired technology, or removable media. In another example, the peer-to-peer connection may be a peer-to-peer wireless network connection. In one example, the processing device may receive the encrypted media item after transmitting a request for the media item to the sharing user device.

At block 504, the processing device may transmit the wrapped encryption key and a request to a media server to determine whether the recipient user device is authorized to play the encrypted media item. The request to determine whether the recipient user device is authorized to play the encrypted media item may include an identifier of the media item. In one example, the recipient user device may tether with the sharing user device and may transmit the request and the wrapped key to the media server using a network connection of the sharing user device.

At block 506, the processing device may receive a response from the media server indicating the recipient user device is authorized to play the encrypted media item. The response may include an encryption key derived from the wrapped encryption key. In some examples, the response from the media server may include a supplemental media item or a link to a supplement media item (e.g., advertisement) that may be presented before, during, or after playing the media item. In other examples, the supplemental media item may be received from the sharing user device when receiving the encrypted media item.

At block 508, the processing device may decrypt the encrypted media item using the encryption key. The encryption key may be the same key that was used by the sharing user device to encrypt the media item. After decrypting the media item, the processing device may indicate via a graphical interface of the recipient user device that the media item is ready to be played. The graphical interface is discussed in more detail in regards to FIG. 14. After decrypting the media item, the recipient user device may add the media item to a media cache and make it available to share with other devices. Sharing with the media item with another device (e.g., third device) is discussed in more detail below in regards to FIGS. 6A-9. Responsive to completing the operations described herein above with references to block 508, the method may terminate.

Figure 6A:
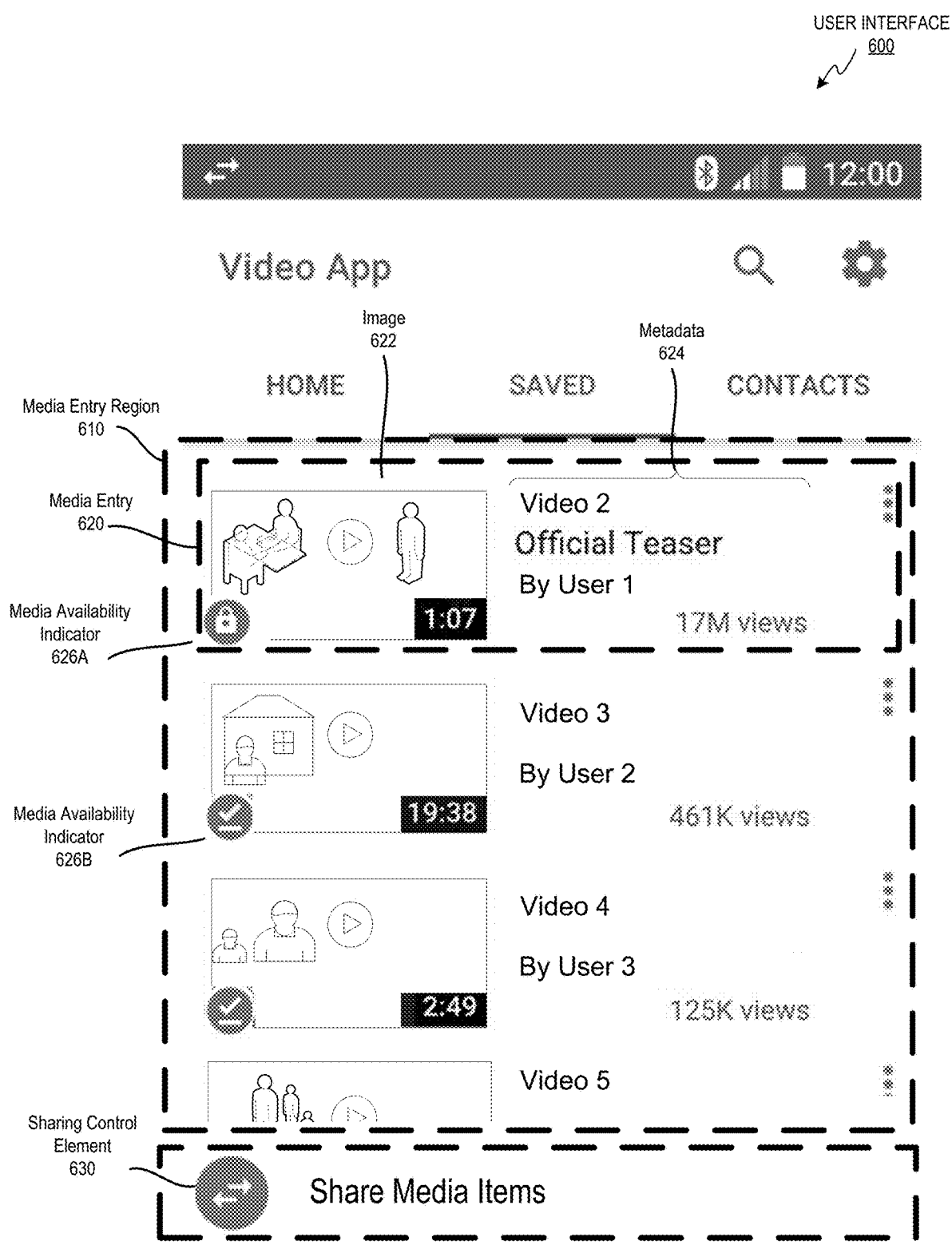
FIG. 6A is an example graphical interface for enabling a user to interact with access control technology for peer-to-peer sharing, in accordance with an implementation of the disclosure.
Figure 6B:
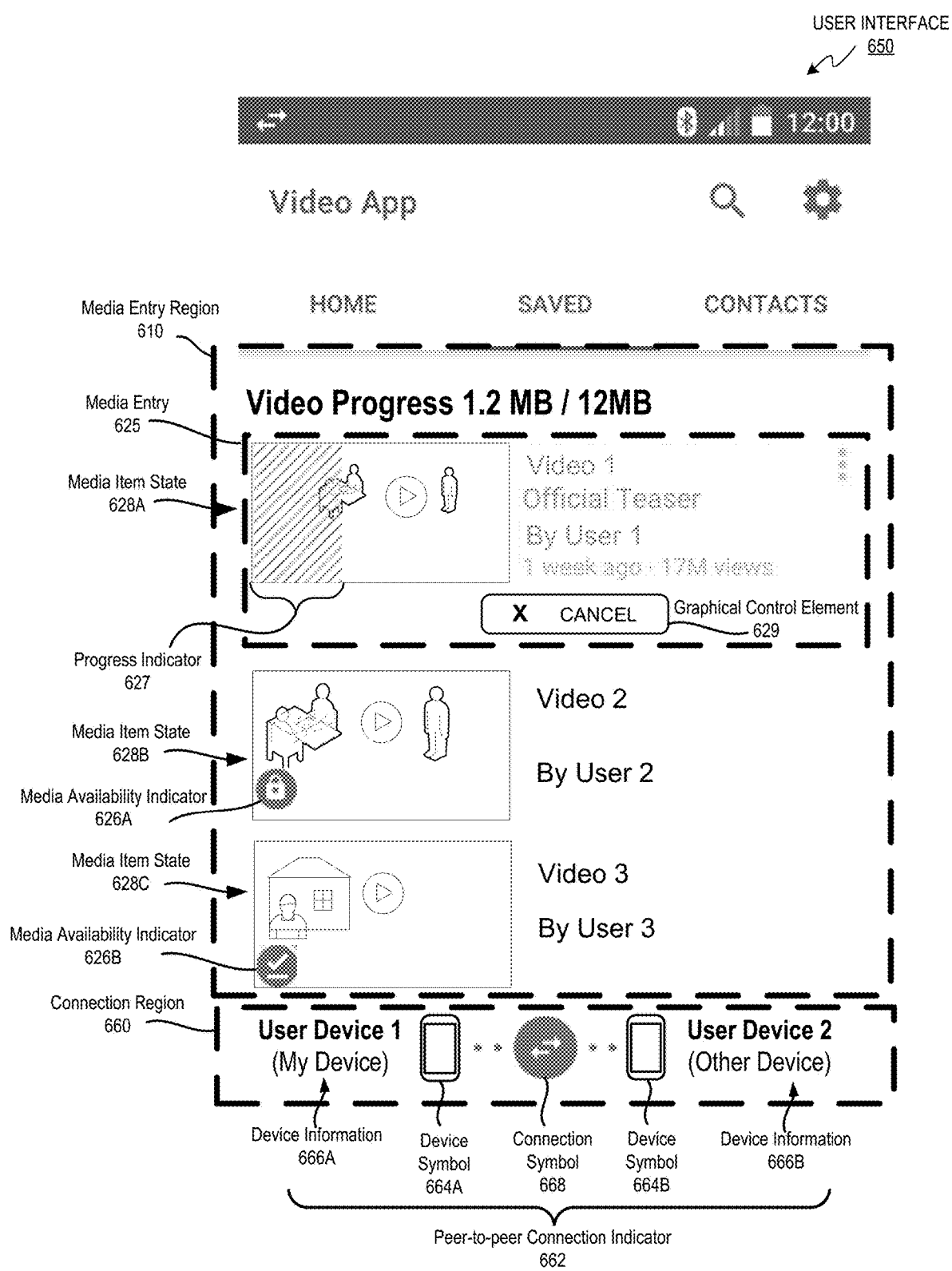
FIG. 6B is another example graphical interface for enabling a user to interact with access control technology for peer-to-peer sharing, in accordance with an implementation of the disclosure.
Figure 7:
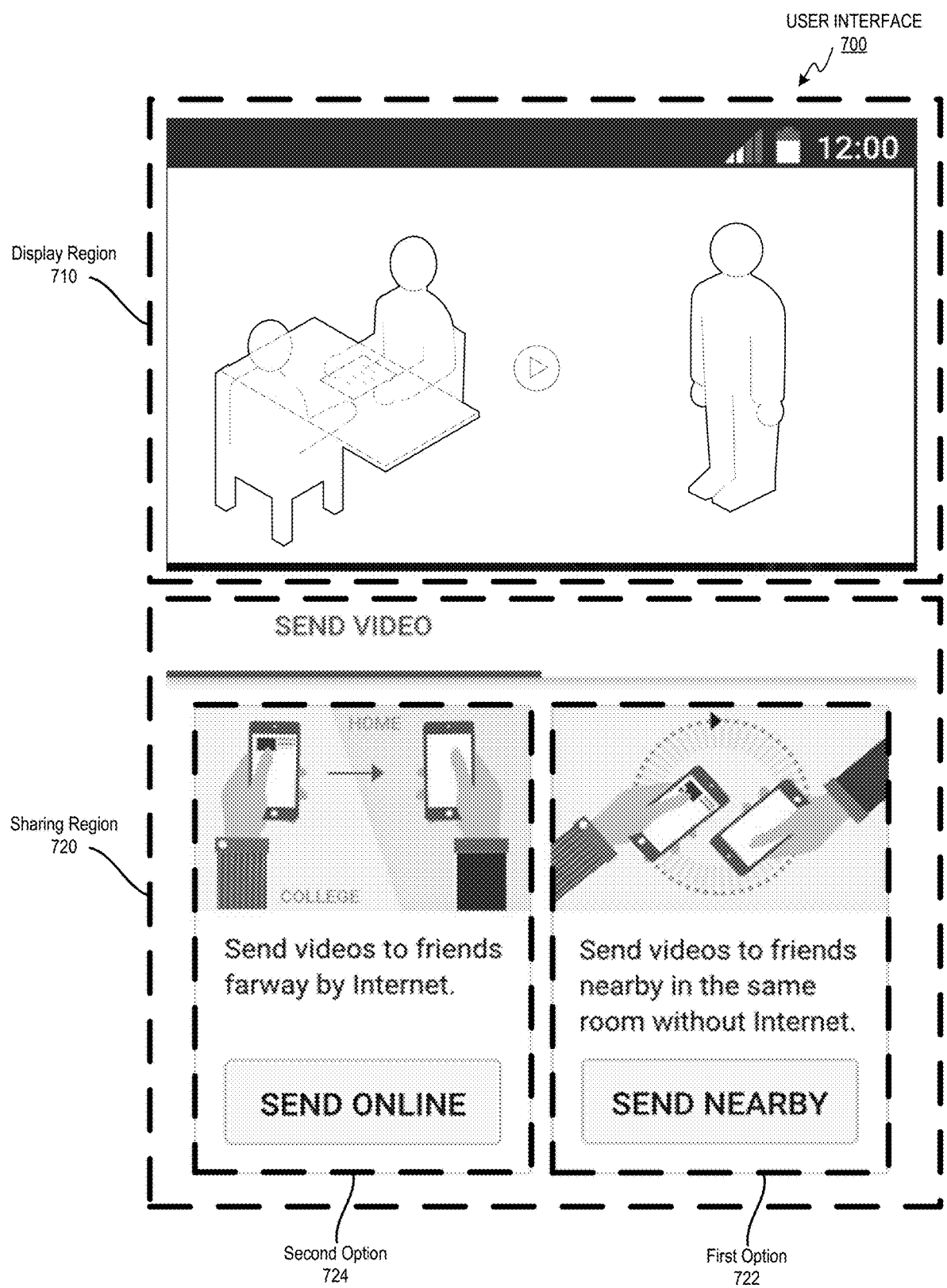
FIGS. 7 through 9 are example graphical interfaces for a user device that is providing a shared media item, in accordance with an implementation of the disclosure.
Figure 8:
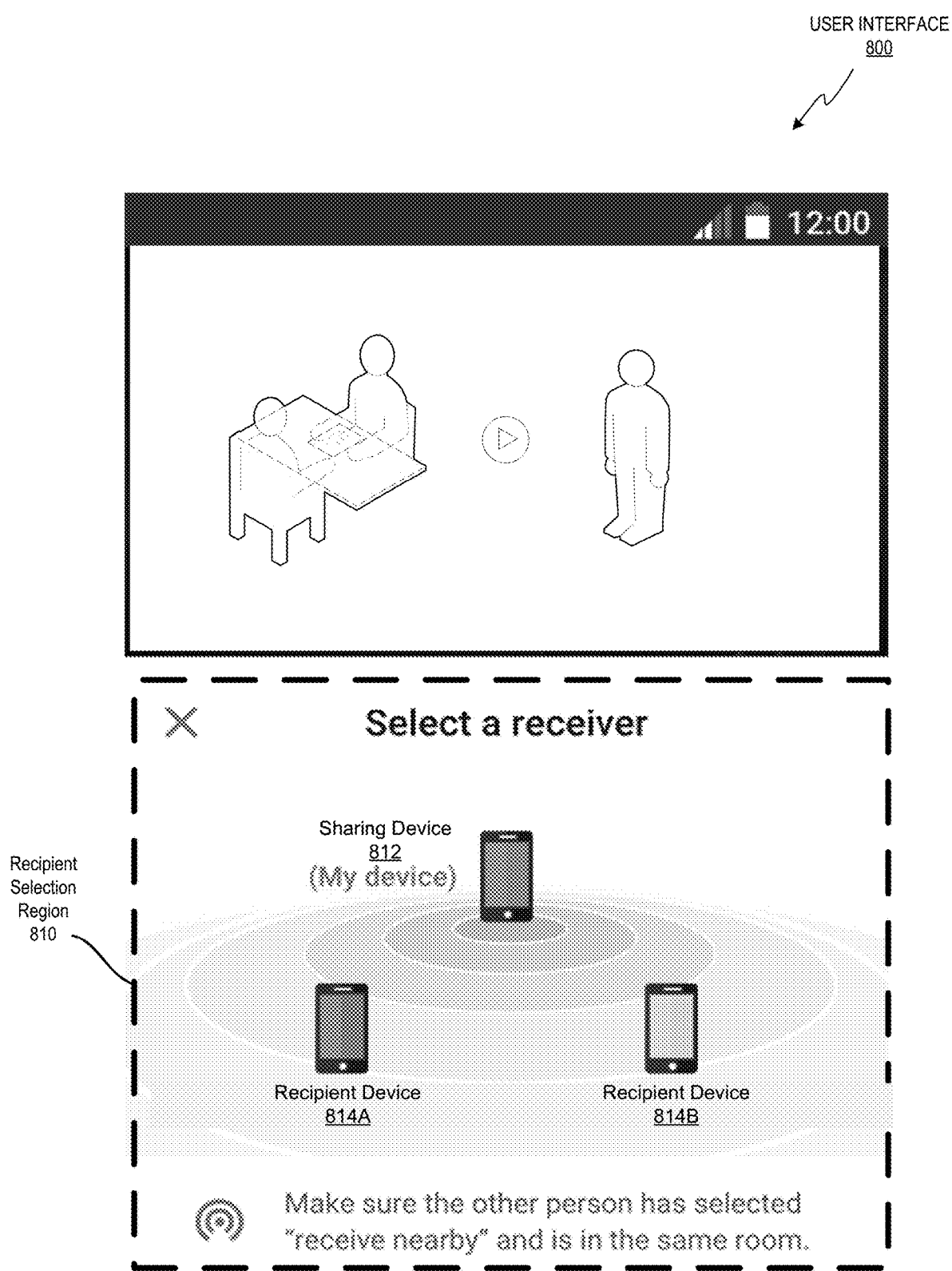
Figure 9:
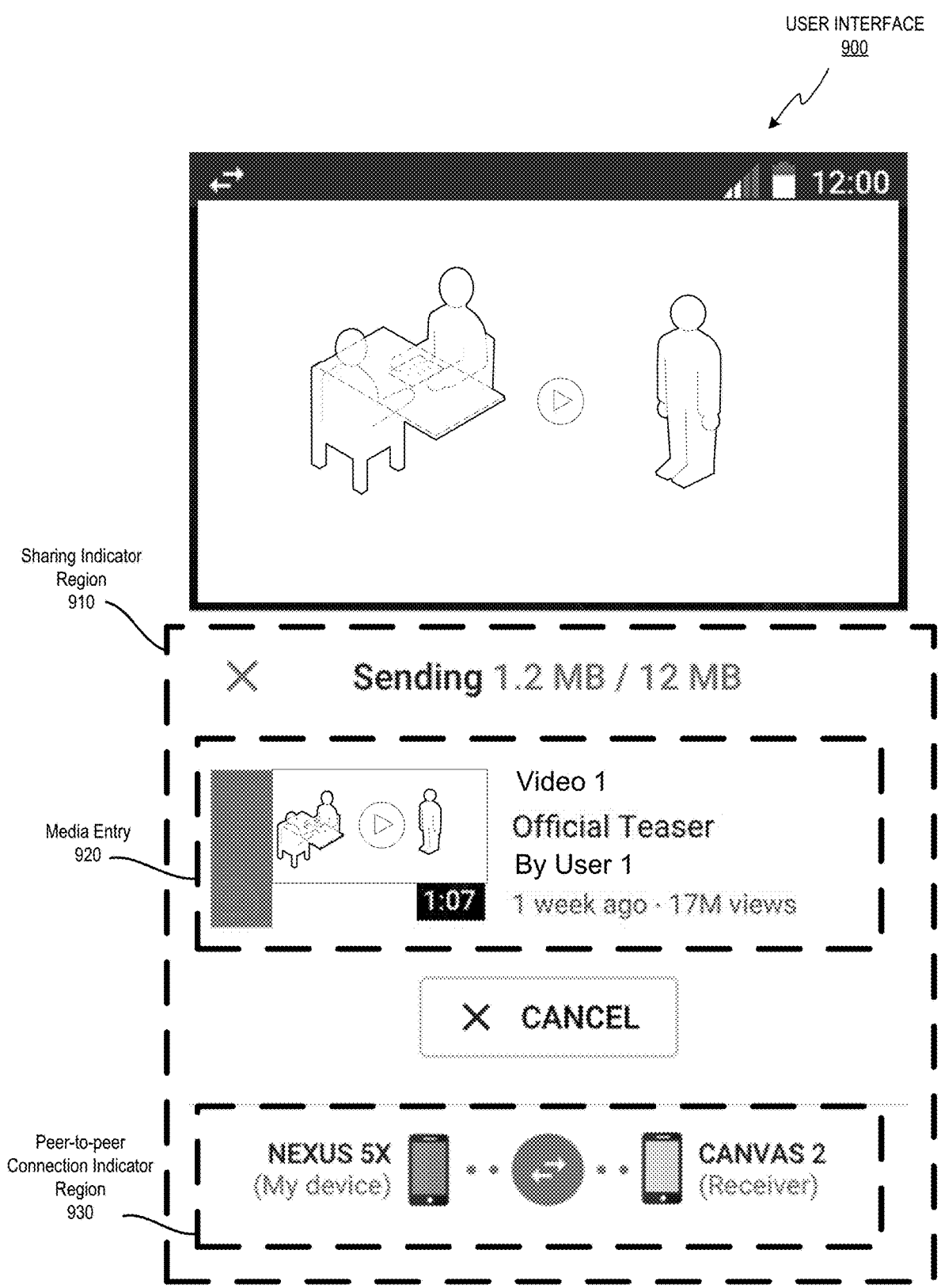

FIGS. 6A-14 illustrate example graphical interfaces for a peer-to-peer sharing mobile application that includes an access control mechanism. FIGS. 6A and 6B represent graphical interfaces that enable a user to view information pertaining to multiple media items and detect the availability of each of the multiple media items. FIGS. 7-9 represent graphical interfaces for selecting a media item and transmitting the media item to another device. FIGS. 10-14 represent example graphical interfaces for receiving a shared media item and processing the media item to make it available to be presented.

Referring to FIG. 6A, user interface 600 may enable a user to view one or more media items and initiate the sharing of one or more of the media items. The one or more media items may be a subset (e.g., some or all) of the media items that are available in the media cache of the local user device (e.g., set of saved media items). The user device may provide user interface 600 to a user in response to receiving user input launching a software component (e.g., mobile application) or may automatically initiate user interface 600 in response to receiving a request to share (transmit or receive) a media item from one or more other user devices. User interface 600 may include one or more graphical elements that provide (e.g., present, display, indicate, reflect) graphical information to a user of a user device. The graphical elements may represent information of an underlying data structure (e.g., media item) and may be updated (e.g., refreshed) when the underlying data structure is modified. In one example, a graphical element may be configured to provide information to a user but may not be configured to receive information from a user (e.g., user input). In another example, a graphical element may be a graphical control element that provides information to a user and may also be configured to receive information from a user, such as receiving user input. The user input may be received by the user device via a touch screen (e.g., taps, swipes, or other touch gestures), a mouse/keyboard (e.g., clicks, scrolls, typing), a camera (e.g., gestures), an accelerometer (e.g., shakes), other sensory device, or a combination thereof. In the example shown in FIG. 6A, user interface 600 may include a media entry region 610, one or more media entries 620, one or more media availability indicators 626 and 626B, and a sharing control element 630.

Media entry region 610 may be any portion of user interface 600 that displays information corresponding to one or more media items. Media entry region 610 may include multiple media items organized into a media item arrangement. In one example, the media item arrangement may be a sequence of media items or a list of media items. Media entry region 610 may be configured to receive user input to adjust (e.g., scroll, pan, zoom, move, reposition) the media item arrangement in one or more directions (e.g., horizontal, vertical, or other direction). As the media item arrangement is adjusted, the location of a particular media item may change and a new media item may be displayed and an existing media item may be hidden. Each media item in the media entry region 610 may be represented by a media entry 620.

Each media entry 620 may be a graphical data structure that provides information corresponding to a particular media item. As shown in FIG. 6A, media entry 620 may include an image 622, metadata 624, and a media availability indicator 626A. Image 622 may be an image representing the media item (e.g., cover image) or a portion of the media item such as an video frame of the media item (e.g., thumbnail image). Metadata 624 may include any information about the media item such as the title, creator, uploader, duration, creation date/time, upload date/time, number of viewers, number of sharers, other information, or a combination thereof.

Media availability indicators 626A and 626B may be graphical elements that represent whether a corresponding media item is available on a particular user device. Media availability indicators 626A and 626B may be any graphical elements or graphical control element and may include shapes (e.g., circles, squares, octagons), symbols (e.g., locks, check marks, arrows), colors (e.g., blue, green, red, yellow), text (e.g., different fonts, sizes), images, other graphics, or a combination thereof.

The graphical elements may be positioned at any location within media entry region 610 or within a corresponding media entry 620. Media availability indicators 626A, 626B may be superimposed on image 622 of a respective media entry 620 or may be positioned at an adjacent position (e.g., above, below, to the side) of the image or media entry 620. In the example shown in FIG. 6A, media availability indicator 626A may be an overlay graphical element that has a blue circular shape and an embedded lock symbol and media availability indicator 626B may be an overlay graphical element that has a blue circular shape and an embedded underlined checkmark symbol. In one example, some or all of the media availability indicators may be graphical control elements that receive user input and perform an action in response. For example, media availability indicator 626A may indicate a media item is in a locked or encrypted state. When media availability indicator 626A receives user input (e.g., tap, click, hover, hold), it may initiate a state transition (e.g., manually initiated decryption) or present information about how to transition the corresponding media item (see FIG. 12). Variations of a media availability indicator may be used to indicate a plurality of different media item states, which are discussed in more detail in regards to FIG. 6B.

Sharing control element 630 may be included within user interface 600 and may enable a user to share one or more media items. Sharing control element 630 may receive user input (e.g., tap, swipe, click, keystroke) and may initiate one or more user interfaces to share media items. Sharing media items may involve transmitting one or more media items to another user device and/or receiving one or more media items from another user device. Sharing control element 630 may include one or more graphical elements and may include shapes (e.g., circles, squares, octagons), symbols (e.g., arrows, locks, check marks,), text, images, other graphics, or a combination thereof. Sharing control element 630 may be positioned at any location within user interface 600, which may or may not include media entry region 610. In the example shown in FIG. 6A, sharing control element 630 may be a graphical control element that has a blue circular shape with embedded parallel horizontal arrows pointing in opposing directions and once selected may cause the user interface to proceed to user interface 700 of FIG. 7.

Referring to FIG. 6B, user interface 650 may be similar to user interface 600 and may display media items that are in different states and one or more of the media items may be transitioning between states. In one example, user interface 650 may include multiple media item states 628A-B, a media entry 625, and a peer-to-peer connection region 660.

Media item states 628A-C may illustrate some of the states a media item may be in or transitioning to or from during use of the user device. Media item state 628A may illustrate an example first state of a media item, wherein the media item has not been saved on a user device but is in the progress of being received (e.g., downloaded) from another device. The other device may be one or more peer user devices, server devices, other devices, or a combination thereof. As discussed above, the version of the media item being received may be an encrypted version and may be accompanied with a wrapped encryption key. The user device may receive the wrapped encryption key before, during, or after receiving the encrypted media item and may be received from the same device that transmitted the encrypted media item or from a different device.

Media item state 628B illustrates a second state of a media item, wherein the media item may be saved on a user device in an encrypted form. The media item may be saved along with a wrapped version of the encryption key. When a media item is in the second state, the user device is unable to interpret or present the media item but may be able to share the encrypted version of the media item with one or more other user devices.

Media item state 628C illustrates a third state of a media item, wherein the media item may be saved on the user device and available to be experienced by a user. A media item may transition from the second state to the third state when the user device decrypts the encrypted version of the media item. As discussed above, the user device may decrypt the media item by sending the wrapped encryption key to a remote device (e.g., content sharing platform), which performs a playability check and unwraps the wrapped encryption key. The unwrapped version of the encryption key may then be sent to the user device and the user device may use it to decrypt the media item, which may enable the media item to transition to media item sate 628C.

Each of the media item states 628A-C may be represented by a respective media availability indicator 626A and 626B or a lack of media availability indicator. For example, media item state 628A may be represented by a lack of a media availability indicator (e.g., hidden media availability indicator), whereas media item states 628B and 628C may be represented by media availability indicators 626A and 626B respectively. A particular media item may transition between one or more of the states during operation of the peer-to-peer sharing technology. For example, a media item may begin in media item state 628A when the encrypted version of the media item and the wrapped encryption key are being downloaded over a peer-to-peer connection from another user device. Once the download completes, the media item may transition to media item state 628B and the user interface 650 may be updated to transition media indicator from media indicator 626A to media indicator 626B.

The media item states 628A-C may also be represented by one or more other graphical features. The other graphical features may include modifying the media entry or a portion of the media entry to adjust the transparency (e.g., greyed out), font (e.g., bold, italicized, highlighted), size (e.g., enlarge, shrink), the arrangement (e.g., indent or protrude a particular media entry). In the example shown in FIG. 6B, media item state 628A may be represented by example media entry 625, which may include a progress indicator 627 and a graphical control element 629. The existence of progress indicator 627, graphical control element 629, a hidden media availability indicator, other feature, or combination of features may indicate the media entry corresponds to media item state 628A.

Progress indicator 627 may be a graphical element that provides a graphical representation of the progression of receiving the media item and/or the wrapped encryption key. Progress indicator 627 may take on any shape such as a bar (e.g., progress bar), circle (e.g., spinning wheel, throbber), other shape, or a combination thereof. The graphical element may be accompanied by a textual representation of the progress in a percent format. The progress indicator may be located at any location on interface 650. In one example, progress indicator 627 may be displayed adjacent (e.g., to the side, above, below) the media image and/or metadata. In another example, progress indicator 627 may be displayed over the media image and/or meta data in a semi-transparent or opaque manner as shown in FIG. 6B.

Graphical control element 629 may enable a user to cancel the transmission of the media item. Cancelling the transmission of the media item may transition the media item from state 628A to another state (e.g., a fourth state) that represents a canceled or failed attempt at downloading the media item (fourth state not shown). Graphical control element 629 may be a button, widget, other element, or a combination thereof.

Connection region 660 may be any portion of user interface 650 that displays information pertaining to one or more connections for transmitting or receiving the media item, encryption key (wrapped or unwrapped), other information, or a combination thereof. The connection may be a peer-to-peer connection, an internet connection, other connection, or a combination thereof. In one example, a connection (e.g., peer-to-peer connection) may be displayed while the encrypted version of the media item and the wrapped encryption key are being received by or transmit from the user device. In another example, the connection (e.g., internet connection) may be displayed while the wrapped or unwrapped encryption key is being received by or transmitted from the user device.

Peer-to-peer connection indicator 662 may be displayed within connection region 660 and may be an example of one type of connection. Peer-to-peer connection indicator 662 may include one or more device symbols 664A and 664B, device information 666A and 666B, and a connection symbol 668. The one or more device symbols 664A and 664B may graphically represent the device and may have different symbols for different types or classes of devices, such as phones, tablets, laptops, desktops, servers, or other devices. Device information 666A and 666B may include identification information for a device such as a device identifier (e.g., device name, user name, IP address) and a relative identifier, which may indicate whether the device identifier corresponds to a local device (e.g., "My Device") or a remote device (e.g., "Other Device," "Transmitting Device," "Receiving Device"). In one example, connection symbol 668 may indicate the underlying technology used for the connection such as a wifi, bluetooth, cellular (e.g., 3G, 4G), other technology, or a combination thereof.

Referring to FIG. 7, user interface 700 may display information for the selected media item and an interface for sharing the selected media item. User interface 700 may include a display region 710 and a sharing region 720. Display region 710 may include an embedded media player for presenting (e.g., playing) the media item. Sharing region 720 may include one or more options for sharing the media item. A first option 722 may enable the media item to be shared with nearby user devices. A second option 724 may enable the media item to be shared with users that are accessible over the internet. When user input indicates a selection of first option 722, user interface 700 may proceed to user interface 800.

Referring to FIG. 8, user interface 800 may enable a user to select one or more user devices that are intended to be the recipient of the shared media item. In one example, the user devices displayed may be user devices that are in the geographic area (e.g., within 30 ft) of the user device. User interface 800 may include a recipient selection region 810 that displays the sharing device 812 and one or more recipient devices 814A and 814B. The locations of recipient devices 814A and 814B relative to sharing device 812 may correspond to the actual physical distance between the corresponding user devices. In response to user input indicating a selection of recipient device 814B, user interface 800 may proceed to user interface 900.

Referring to FIG. 9, user interface 900 may provide information about the sharing of a media item before, during, and after the transfer of the media item. User interface 900 may include a sharing indicator region 910 and a peer-to-peer connection indicator region 930. Sharing indicator region 910 may include a media entry 920, which may be the same or similar to media entry 620 of FIG. 6A. Peer-to-peer connection indicator region 930 may display the local user device and the selected recipient device.

Figure 10:
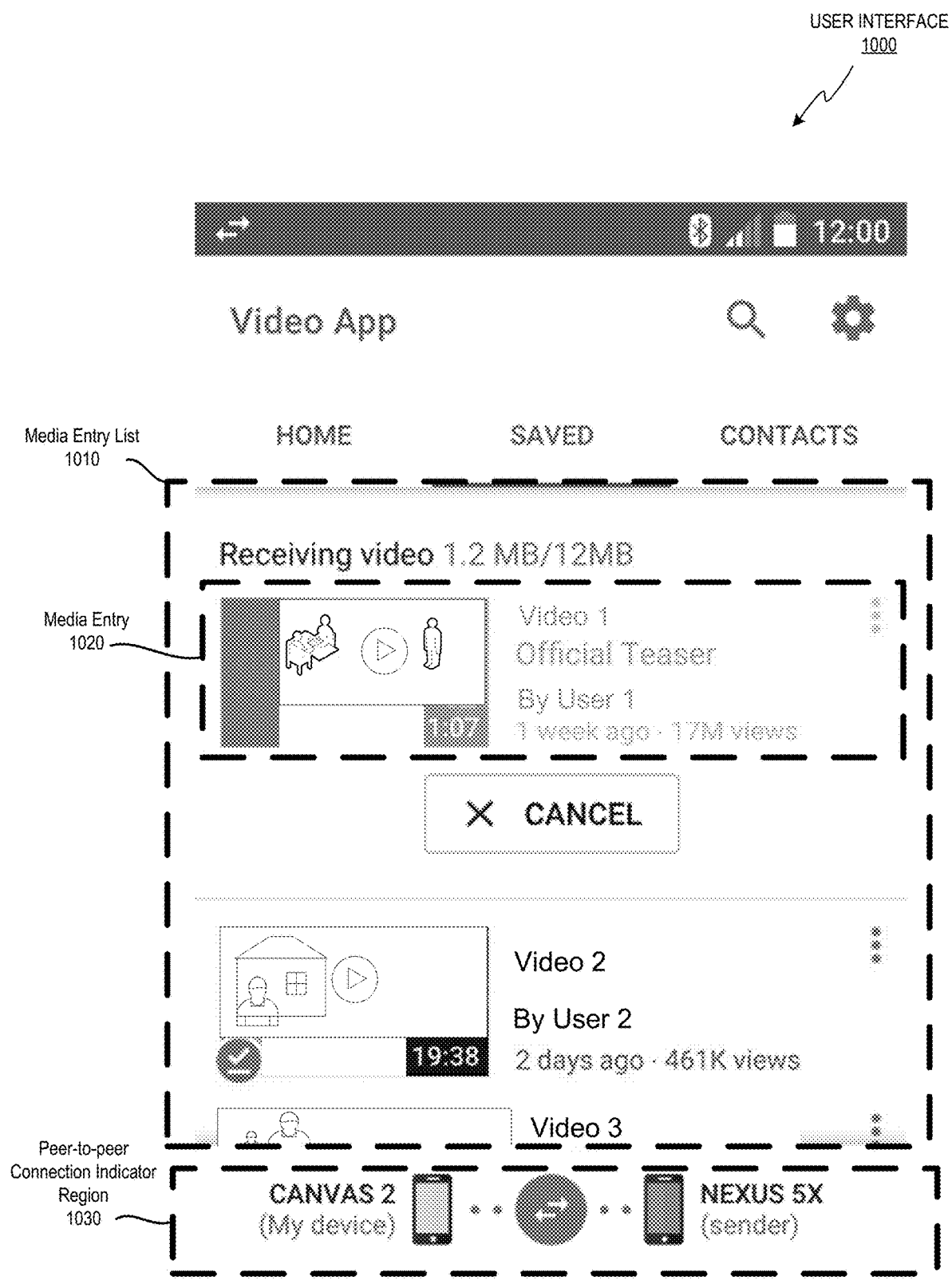
FIGS. 10 through 14 are exemplary graphical interfaces for a user device that is receiving a shared media item, in accordance with an implementation of the disclosure.

FIGS. 10-14 may include examples of user interfaces that are presented when receiving a shared media item, as opposed to sending the shared media item. Referring to FIG. 10, user interface 1000 may provide information about a media item before, during, and after receiving the media item. User interface 1000 may be similar to user interface 600 and 900 but may be presented by the receiving device as opposed to the sending device. User interface 1000 may include a media list 1010 and a peer-to-peer connection indicator region 1030. The media list 1010 may include one or more media entries 1020 that are the same or similar to media entries 620 of FIG. 6A. Peer-to-peer connection indicator region 1030 may display the local user device and the selected sending device, as opposed to the recipient device shown in FIG. 9.

Figure 11:
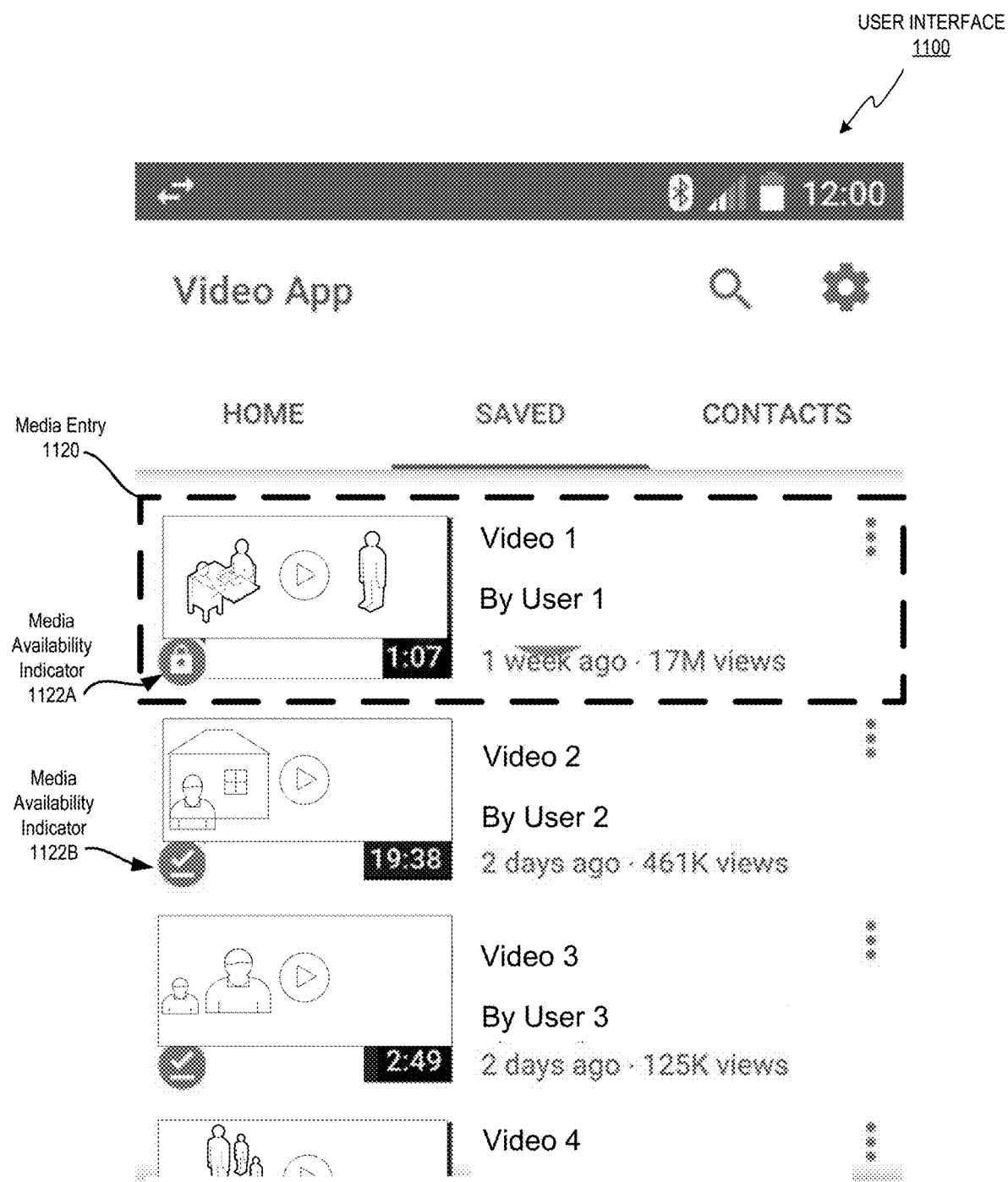

Referring to FIG. 11, user interface 1100 may provide information about the media items that are in the media cache of the local user device (e.g., saved media items). User interface 1100 may be the same or similar to user interface 600 and may include one or more media entries 1120. Each media entry 1120 may include a media availability indicator 1122A or 1122B. Media availability indicator 1122A may indicate the media item is stored in the media cache (e.g., off-lined) but is not available to be played. This may be because the media item may be encrypted. Media availability indicator 1122B may indicate the media item is available to be played or shared with another user device.

Figure 12:
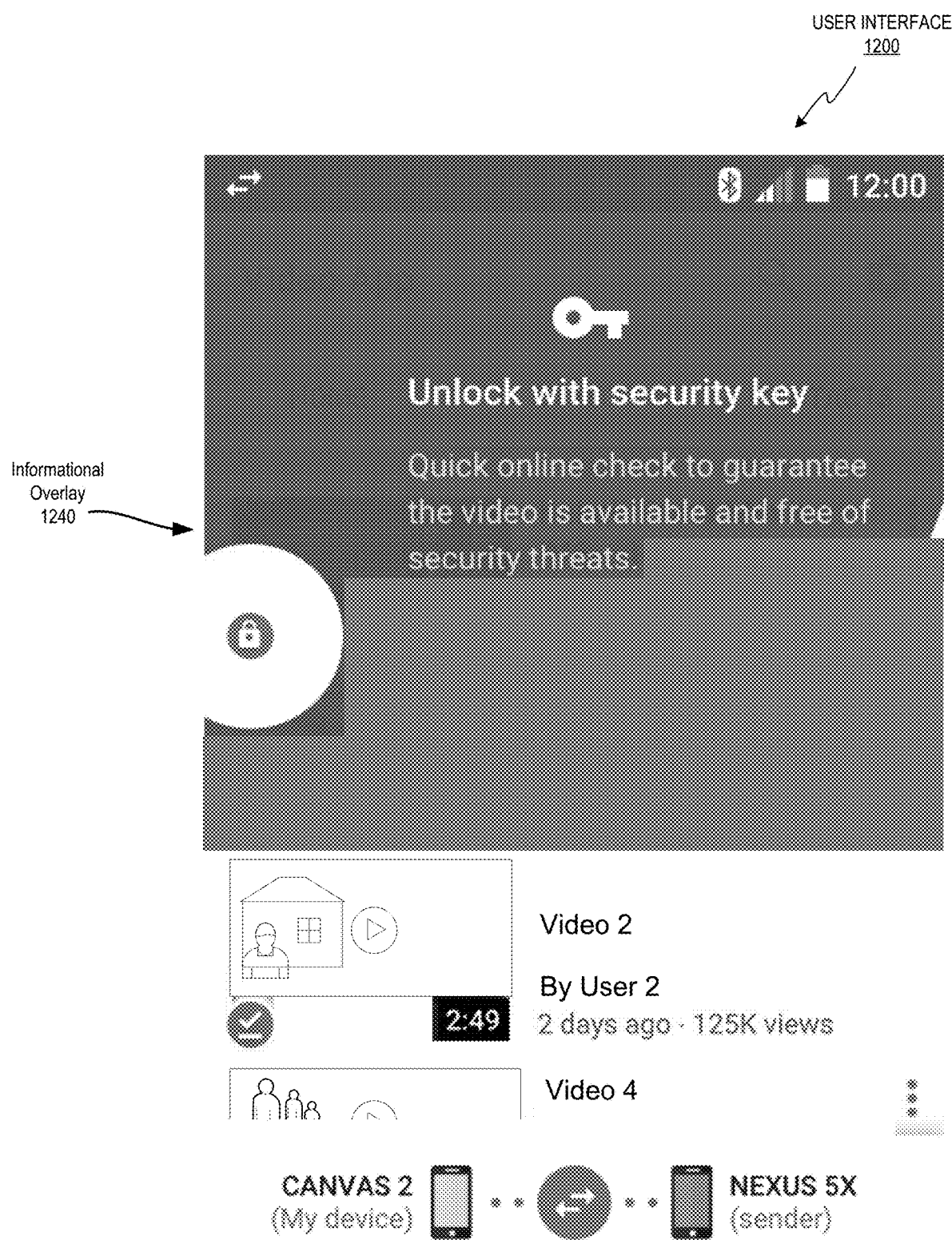

Referring to FIG. 12, user interface 1200 may provide information about verifying and decrypting a received media item. User interface 1200 may include an informational overlay 1240 that provides information about decrypting and verifying the media item. It may indicate to the user that a playability check is available to ensure the video is available and a verification check can be performed to ensure that the media item originated from the media server and is free of unauthorized modifications (e.g., security threats).

Figure 13:
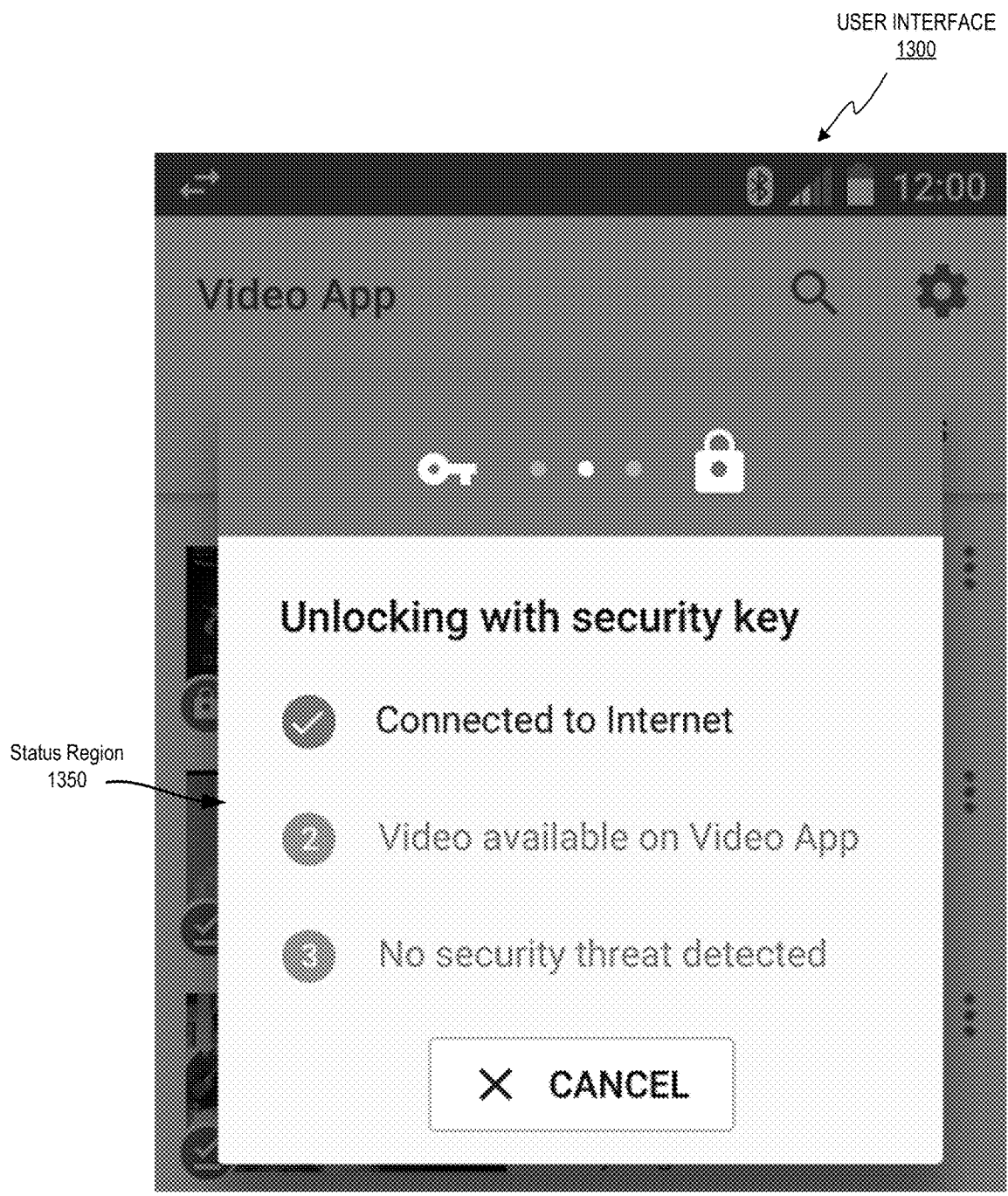

Referring to FIG. 13, user interface 1300 may provide information process steps related to the playability check and the verification check. User interface 1300 may include a status region 1350 that provides information about the status of the decrypting and verification processes. In one example, it may display whether the each of the one or more process has completed.

Figure 14:
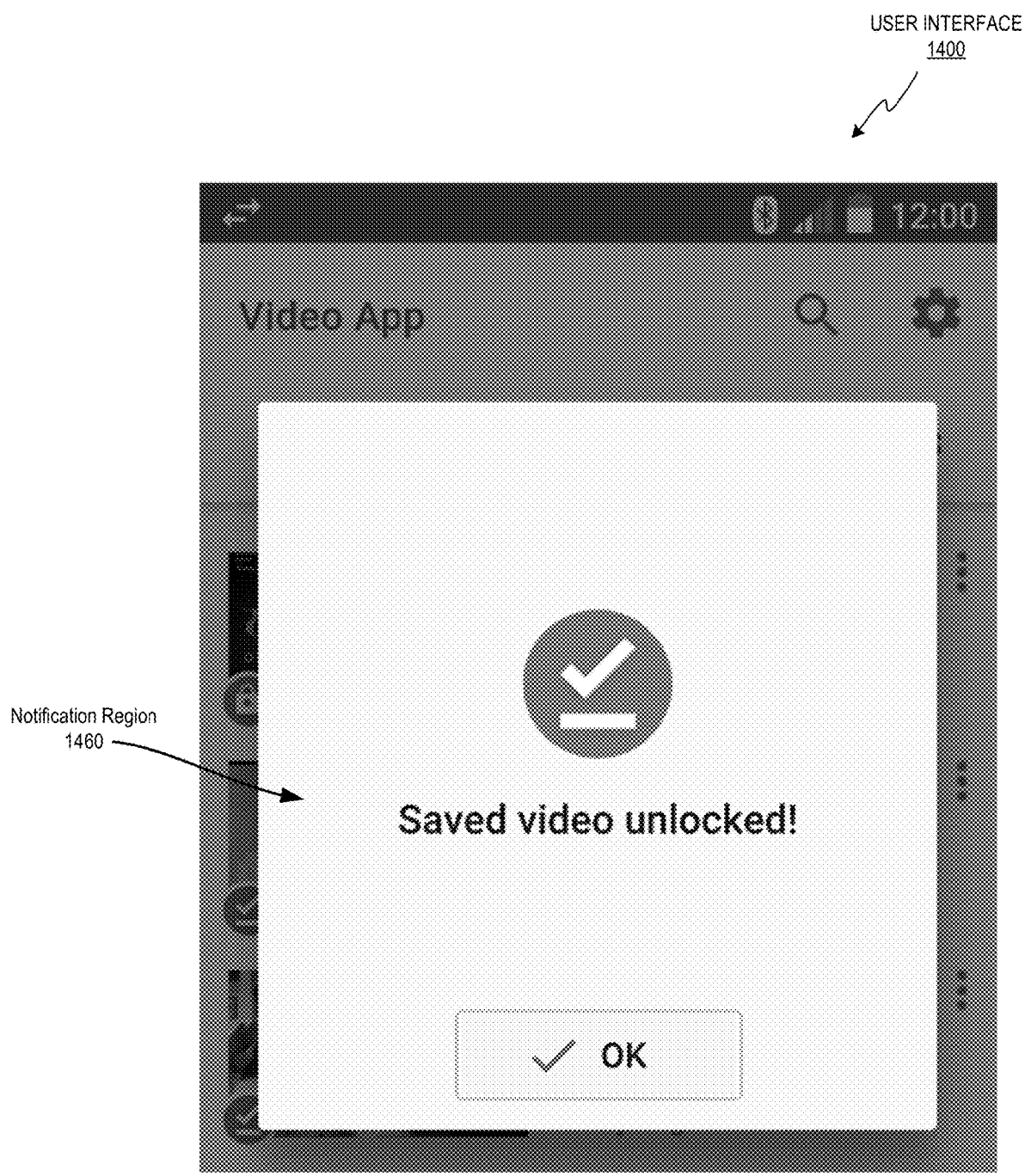

Referring to FIG. 14, user interface 1400 may include a notification region 1460 that provides a notification that includes a graphical, textual, audio, tactile, or other component.

Figure 15:
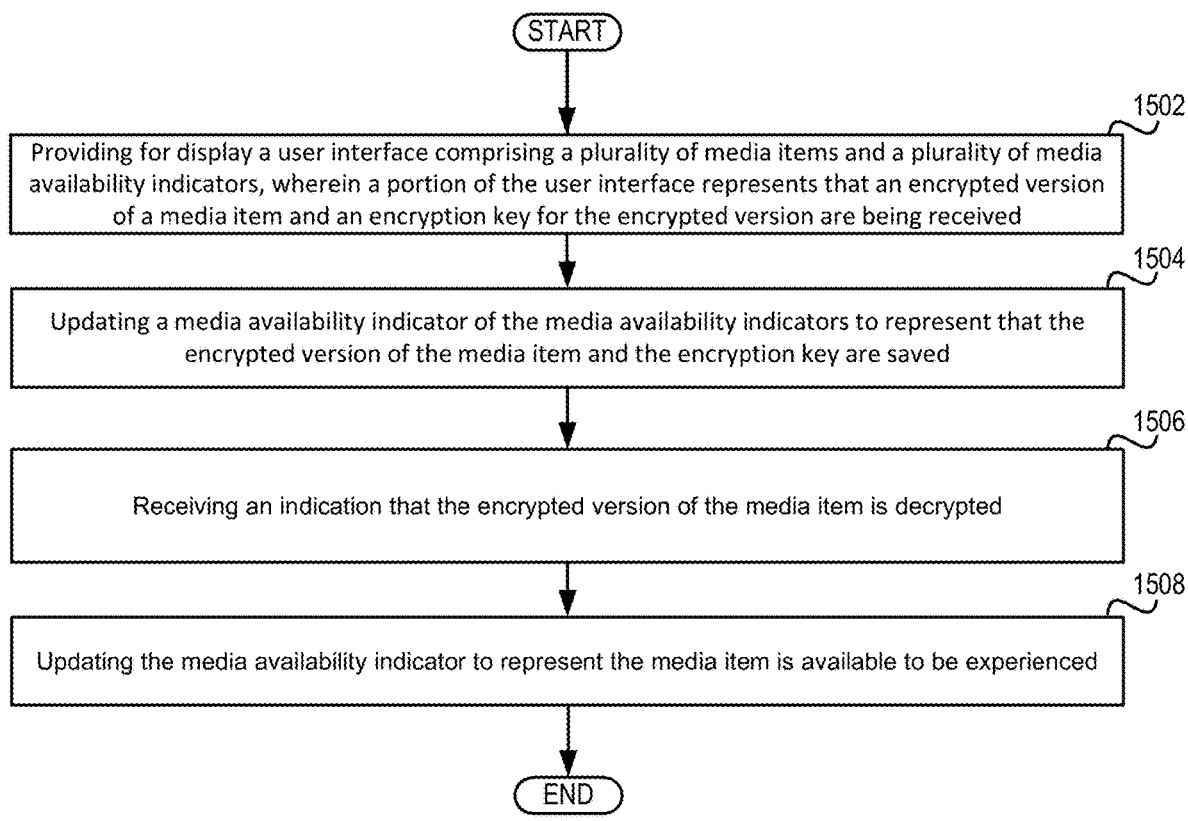
FIG. 15 is a flow diagram illustrating an example method for providing a graphical interface enabling a user to interact with an access control technology for peer-to-peer sharing, in accordance with an implementation of the disclosure.

FIG. 15 depicts a flow diagram of an illustrative example of method 1500 for providing a user interface for a peer-to-peer media sharing application. Method 1500 may be similar to methods 300, 400, and 500 discussed above and may focus on providing a graphical interface on a user device that enables a user to visualize one or more features or steps of methods 300, 400, and 500. Method 1500 may be performed by one or more processing devices of the user device and may begin at block 1502.

At block 1502, the processing device of the user device may provide for display a user interface comprising a plurality of media items and a plurality of media availability indicators. The user interface may be the same or similar to user interface 600 of FIG. 6A and may include media availability indicators 626A and 626B. The processing device may provide the user interface in response to receiving user input launching a software component (e.g., mobile application) or may be initiated automatically in response to receiving a request to share (transmit or receive) a media item. In one example, each of the plurality of the media items may be displayed along with a media availability indicator. In another example, some of the media items may be displayed with media availability indicator and other media items may be displayed with a hidden media indicator or without a media indicator. In the latter example, the hidden media indicator may indicate that the corresponding media item (e.g., an encrypted version of the media item) is in the process of being received and the media item is not yet saved on the user device or available to be experienced. When the user device is receiving the media item there may be a portion of the user interface that represents that the encrypted version of the media item and a corresponding wrapped version of an encryption key are being received from another device.

In one example, the user interface may include a graphical control element (e.g., sharing control element 630. in FIG. 6A) to initiate the receiving of the wrapped version of the encryption key for the media item over a peer-to-peer connection. In another example, the user interface may indicate a peer-to-peer connection (e.g., peer-to-peer connection 130 of FIG. 1) used to receive the encrypted version of the media item and indicate that an internet connection is used to decrypt the media item (e.g., status region 1350 in FIG. 13). The peer-to-peer connection may be displayed as a peer-to-peer connection indicator (e.g., peer-to-peer connection indicator 662 in FIG. 6B) that identifies a user device that is providing the encrypted version of the media item and also identifies the user device that is receiving the encrypted version of the media item.

At block 1504, the processing device may update a media availability indicator of the media availability indicators to represent that the encrypted version of the media item and the encryption key are saved on the local device. The update may be responsive to receiving a signal indicating that a download of the media item and encryption key has completed. In one example, the media availability indicator may be used to distinguish between three different states of a particular media item. A first state may indicate the media item is not saved on a user device. A second state may indicate the media item is saved locally in an encrypted form. A third state may indicate the media item is saved and available to be experienced (e.g., consumed by a user of the user device). More or less states may exist and may be displayed to a user via the user interface.

At block 1506, the processing device may receive an indication that the encrypted version of the media item is decrypted. The indication may be received from a module of the user device (e.g., decryption module 232 in FIG. 2). The decryption may be in view of an encryption key that may be used for encrypting and decrypting the media item. The encryption key may be received by a peer device or other remote device (e.g., content sharing platform). In one example, a user device may include a wrapped encryption key and may transfer the wrapped encryption key to a server and in response may receive an unwrapped encryption key. The user device may then use the unwrapped encryption key along with one or more cryptographic functions to decrypt the media item.

At block 1508, the processing device may update the media availability indicator to represent the media item is available to be experienced. The update may be responsive to receiving the indication that the encrypted version of the media item is decrypted. Updating the media availability indicator may involve replacing a first media availability indicator with a second media availability indicator. Updating the media availability indicator may also or alternatively involve modifying the existing media availability indicator to adjust the embedded symbol, color, shape, format, other graphical attribute, or a combination thereof.

In one example, each of the plurality of media items may be represented within the user interface by a media entry. The media entry may include multiple graphical portions with different forms of data (e.g., images, text). A first graphical portion may include an image of the media item (e.g., image 622 of FIG. 6A) and the second graphical portion may include textual information of the media item (e.g., metadata 624 of FIG. 6A). One or more portions of the media entry or user interface may be configured to receive user input corresponding to a particular media item and initiating a presentation of the particular media item. The user input may be received by the user device via a touch screen (e.g., taps, swipes, or other touch gestures), a mouse/keyboard (e.g., clicks, scrolls, typing), a camera (e.g., gestures), an accelerometer (e.g., shakes), other sensory device, or a combination thereof. The presentation of the particular media item may occur by a media player that is embedded within a portion of the user interface or may occur within a different user interface. Responsive to completing the operations described herein above with references to block 1508, the method may terminate.

Figure 16:
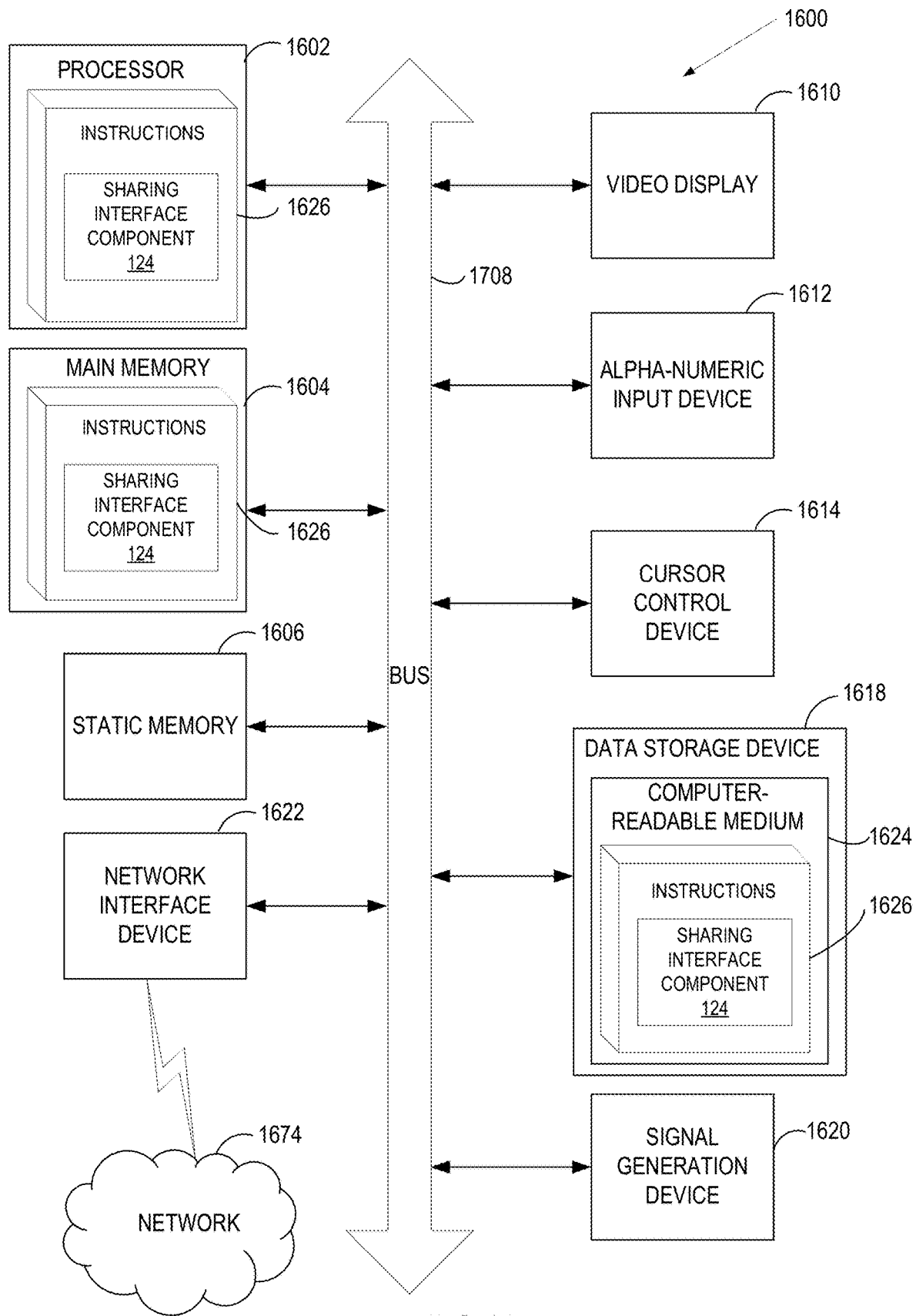
FIG. 16 is a block diagram illustrating one implementation of a computer system, in accordance with an implementation of the disclosure.

FIG. 16 depicts a block diagram of a computer system operating in accordance with one or more aspects of the present disclosure. In certain implementations, computer system 1600 may be connected (e.g., via a network, such as a Local Area Network (LAN), an intranet, an extranet, or the Internet) to other computer systems. Computer system 1600 may operate in the capacity of a server or a client computer in a client-server environment, or as a peer computer in a peer-to-peer or distributed network environment. Computer system 1600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1600 may include a processing device 1602, a volatile memory 1604 (e.g., random access memory (RAM)), a non-volatile memory 1606 (e.g., read-only memory (ROM) or electrically-erasable programmable ROM (EEPROM)), and a data storage device 1616, which may communicate with each other via a bus 1608.

Processing device 1602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1600 may further include a network interface device 1622. Computer system 1600 also may include a video display unit 1610 (e.g., an LCD), an alphanumeric input device 1612 (e.g., a keyboard), a cursor control device 1614 (e.g., a mouse), and a signal generation device 1620.

Data storage device 1616 may include a non-transitory computer-readable storage medium 1624 on which may store instructions 1626 encoding any one or more of the methods or functions described herein, including instructions encoding sharing interface component 124 of FIG. 2 and for implementing method 500.

Instructions 1626 may also reside, completely or partially, within volatile memory 1604 and/or within processing device 1602 during execution thereof by computer system 1600, hence, volatile memory 1604 and processing device 1602 may also constitute machine-readable storage media.

While computer-readable storage medium 1624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "detecting," "determining," "releasing," "destroying," "initiating," "creating," "abandoning," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300, 400, 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
providing for display, by a user device, a user interface comprising a plurality of media items and a plurality of media availability indicators, wherein a media availability indicator of the user interface specifies whether an encrypted version of a media item has been received at the user device;
updating, by the user device, the media availability indicator to specify that the encrypted version of the media item and a wrapped key have been received over a connection at the user device, wherein the wrapped key was encrypted using a public key of a server;
causing initiation of a transmission of the wrapped key to the server, wherein the wrapped key comprises a cryptographic key for the encrypted version of the media item;
receiving, by the user device, the cryptographic key that is unwrapped by the server using a private key of the server; and
updating the media availability indicator of the user interface to represent the media item is available to be experienced.

2. The method of claim 1, wherein the user interface comprises a graphical control element to initiate receiving of the wrapped key for the media item over the connection.

3. The method of claim 2, wherein the user interface indicates the connection used to receive the encrypted version of the media item and indicates that an internet connection is used for the receiving of the cryptographic key to decrypt the media item.

4. The method of claim 1, wherein the user interface comprises a connection indicator identifying a peer user device that is providing the encrypted version of the media item and identifying the user device receiving the encrypted version of the media item.

5. The method of claim 1, wherein the media availability indicator is used to distinguish between three states of the media item, a first state indicating the media item is not saved on the user device, a second state indicating the media item is saved in the encrypted version, and a third state indicating the media item is saved and available to be experienced.

6. The method of claim 1, wherein each of the plurality of media items is represented within the user interface by a media entry comprising a first graphical portion and a second graphical portion, the first graphical portion comprising an image of a respective media item and the second graphical portion comprising textual information of the respective media item.

7. The method of claim 1 further comprising, receiving user input corresponding to a particular media item and initiating a presentation of the particular media item.

8. The method of claim 7, wherein the user interface comprises a portion for the presentation of the particular media item on the user device.

9. A system comprising:
a memory; and
a processing device communicably coupled to the memory, the processing device to:
provide a user interface comprising a plurality of media items and a plurality of media availability indicators, wherein a media availability indicator of the user interface specifies whether an encrypted version of a media item has been received at a user device;
update, by the user device, the media availability indicator to specify that the encrypted version of the media item and a wrapped key have been received over a connection at the user device, wherein the wrapped key was encrypted using a public key of a server;
cause initiation of a transmission of the wrapped key to the server, wherein the wrapped key comprises a cryptographic key for the encrypted version of the media item;
receive the cryptographic key that is unwrapped by the server using a private key of the server; and
update the media availability indicator of the user interface to represent the media item is available to be experienced.

10. The system of claim 9, wherein the user interface comprises a graphical control element to initiate the receiving of the wrapped key for the media item over the connection.

11. The system of claim 10, wherein the user interface indicates the connection used to receive the encrypted version of the media item and indicates that an internet connection is used to receive the cryptographic key to decrypt the media item.

12. The system of claim 9, wherein the user interface comprises a connection indicator identifying a peer user device that is providing the encrypted version of the media item and identifying the user device receiving the encrypted version of the media item.

13. The system of claim 9, wherein the media availability indicator is used to distinguish between three states of the media item, a first state indicating the media item is not saved on a user device, a second state indicating the media item is saved in the encrypted version, and a third state indicating the media item is saved and available to be experienced.

14. The system of claim 9, wherein each of the plurality of media items is represented within the user interface by a media entry comprising a first graphical portion and a second graphical portion, the first graphical portion comprising an image of a respective media item and the second graphical portion comprising textual information of the respective media item.

15. A non-transitory machine-readable storage medium storing instructions which, when executed, cause a processing device to:
provide for display, by a user device, a user interface comprising a plurality of media items and a plurality of media availability indicators, wherein a media availability indicator of the user interface specifies whether an encrypted version of a media item has been received at the user device;
update, by the user device, the media availability indicator to specify that the encrypted version of the media item and a wrapped key have been received over a connection at the user device, wherein the wrapped key was encrypted using a public key of a server;
cause initiation of a transmission of the wrapped key to the server, wherein the wrapped key comprises a cryptographic key for the encrypted version of the media item;
receive, by the user device, the cryptographic key that is unwrapped by the server using a private key of the server; and
update the media availability indicator of the user interface to represent the media item is available to be experienced.

16. The non-transitory machine-readable storage medium of claim 15, wherein the user interface comprises a graphical control element to initiate receiving of the wrapped key for the media item over the connection.

17. The non-transitory machine-readable storage medium of claim 16, wherein the user interface indicates the connection used to receive the encrypted version of the media item and indicates that an internet connection is used to receive the cryptographic key to decrypt the media item.

18. The non-transitory machine-readable storage medium of claim 15, wherein the user interface comprises a connection indicator identifying a peer user device that is providing the encrypted version of the media item and identifying the user device receiving the encrypted version of the media item.

19. The non-transitory machine-readable storage medium of claim 15, wherein the media availability indicator is used to distinguish between three states of the media item, a first state indicating the media item is not saved on a user device, a second state indicating the media item is saved in the encrypted version, and a third state indicating the media item is saved and available to be experienced.

20. The non-transitory machine-readable storage medium of claim 15, wherein each of the plurality of media items is represented within the user interface by a media entry comprising a first graphical portion and a second graphical portion, the first graphical portion comprising an image of a respective media item and the second graphical portion comprising textual information of the respective media item.

* * * * *